US006469295B1

(12) United States Patent
Park

(10) Patent No.: US 6,469,295 B1
(45) Date of Patent: Oct. 22, 2002

(54) MULTIPLE REFLECTION TIME-OF-FLIGHT MASS SPECTROMETER

(75) Inventor: Melvin A. Park, Billerica, MA (US)

(73) Assignee: Bruker Daltonics Inc., Billerica, MA (US)

( * ) Notice: Subject to any disclaimer, the term of this patent is extended or adjusted under 35 U.S.C. 154(b) by 0 days.

(21) Appl. No.: 09/282,076

(22) Filed: Mar. 30, 1999

Related U.S. Application Data

(63) Continuation-in-part of application No. 08/866,134, filed on May 30, 1997, now Pat. No. 6,107,625.

(51) Int. Cl.[7] .......................... B01D 59/44; H01J 49/00

(52) U.S. Cl. ...................................... 250/282; 250/287

(58) Field of Search ................................ 252/287, 282, 252/288

(56) References Cited

U.S. PATENT DOCUMENTS 4,072,862 A * 2/1978 Mamyrin et al. ........... 250/287
5,144,112 A * 9/1992 Yoshida ...................... 250/287
5,144,127 A * 9/1992 Williams et al. ............ 250/282
5,572,035 A * 11/1996 Franzen .................. 250/396 R
5,641,959 A * 6/1997 Holle et al. ................. 250/287
5,654,545 A * 8/1997 Holle et al. ................. 250/282
5,739,529 A * 4/1998 Laukien et al. ............. 250/287

* cited by examiner

*Primary Examiner*—Bruce Anderson
(74) *Attorney, Agent, or Firm*—Ward & Olivo

(57) ABSTRACT

The present invention relates to an apparatus and method for analyzing ions including an ion accelerator and one or more reflectrons positioned with respect to one another such that ions can be reflected back and forth between therebetween. The ion accelerator acts both to provide the initial acceleration of ions received from an ion source and to reflect these ions in the subsequent mass analysis. The reflectrons act only reflect ions in such a manner that all ions of a given mass-to-charge ratio have substantially the same flight time through the analyzer. During ion analysis, ions are reflected back and forth between the accelerator and the reflectrons multiple times, until, at the conclusion of the ion analysis, the accelerator is rapidly deenergized so as to allow the ions to pass through the accelerator and into a detector. Alternatively, the ions may be deflected into a detector using electrostatic deflection plates or may pass through one of the reflectrons into a detector by deenergizing one of the reflectrons. By reflecting the analyte ions back and forth between the accelerator and the reflectron many times, a much longer flight path can be achieved than previously used according to the prior art. Consequently, the mass resolving power of the spectrometer disclosed can be substantially greater than could otherwise be achieved.

36 Claims, 17 Drawing Sheets

MULTIPLE REFLECTION TIME-OF-FLIGHT MASS SPECTROMETER

CROSS-REFERENCE TO RELATED APPLICATIONS

This application is a continuation-in-part of application Ser. No. 08/866,134, filed May 30, 1997 U.S. Pat. No. 6,107,625.

TECHNICAL FIELD OF THE INVENTION

The present invention relates generally to the mass spectroscopic analysis of chemical samples and more particularly to time-of-flight mass spectrometry. A means and method are described for the analysis of ionized species in a spectrometer comprising two or more reflecting devices such that ions can be reflected back and forth a plurality of times therebetween.

BACKGROUND OF THE PRESENT INVENTION

The present invention relates in general to ion beam handling in mass spectrometers and more particularly to a means of focusing ions in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/q) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOF) mass analyzers, which are of particular importance with respect to the invention disclosed herein. Each mass spectrometric method has a unique set of attributes. Thus, TOFMS is one mass spectrometric method that arose out of the evolution of the larger field of mass spectrometry.

The analysis of ions by TOFMS is, as the name suggests, based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications.

TOFMS is used to form a mass spectrum for ions contained in a sample of interest. Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet as timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation CID. Such collisions can be carried out at high (5–10 keV) or low (10–100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis.

In a TOFMS instrument, molecular and fragment ions formed in the source are accelerated to a kinetic energy:

$$qV=\tfrac{1}{2}mv^2 \quad (1)$$

where q is the elemental charge, V is the potential across the source/accelerating region, m is the ion mass, and v is the ion velocity. These ions pass through a field-free drift region of length L with velocities given by equation 1. The time required for a particular ion to traverse the drift region is directly proportional to the square root of the mass/charge ratio:

$$t=L(m/2qV)^{1/2} \quad (2)$$

Conversely, the mass/charge ratios of ions can be determined from their flight times according to the equation:

$$m/e=\alpha t^2+\beta \quad (3)$$

where $\alpha$ and $\beta$ are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., *Rev. Sci. Instrumen.* 26 1150 (1955)). That instrument utilized electron impact (EI) ionization (which is limited to volatile samples) and a method for spatial and energy focusing known as time-lag focusing. The simplest form of the Wiley-McLaren instrument is depicted in FIG. 1. The instrument consists, in part, of an ion accelerator, a detector, and a field free drift region between the accelerator and the detector. At the beginning of an analysis, ions are located in the accelerator near plane $P_1$—the "object plane". The ions initially have near thermal kinetic energies. To begin the analysis, an electrical potential is applied to the accelerator. The electric field in the accelerator accelerates ions toward a detector which resides at plane $P_2$—the "image plane". For the purpose of the present discussion, it is assumed that ions are accelerated in a single region of the accelerator and that the electric field strength is uniform throughout this region.

As was first derived by Wiley and Maclaren, ions of a given mass-to-charge ratio (m/q) starting at a variety of positions near the object plane will all arrive at the image plane at substantially the same time. This effect is referred to by Wiley and Maclaren as "space focusing". Notice that if s is the distance between the object plane, $P_1$, and the end of the accelerator, then D, the distance between the image plane, $P_2$, and the end of the accelerator, will be equal to 2s. Placing the detector at the image plane will result in the optimal space focusing and therefore the highest mass resolution.

Wiley and Maclaren also described the use of two consecutive acceleration regions whereby an image plane may be formed farther from the accelerator and therefore provide higher mass resolution. It is this "two stage" acceleration instrument that was commercialized. In the commercialized instrument, molecules are first ionized by a pulsed (1–5 microsecond) electron beam. Spatial focusing was accomplished using two stages of ion acceleration. In the first stage, a low voltage (−150 V) drawout pulse is applied to the source region that compensates for ions formed at different locations, while the second stage completes the acceleration of the ions to their final kinetic energy (−3 keV ). A short time-delay (1–7 microseconds) between the ionization and drawout pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV. The instrument was commercialized by Bendix Corporation as the model NA-2, and later by CVC Products (Rochester, N.Y.) as the model CVC-2000 mass spectrometer. The instrument has a practical mass range of 400 daltons and a mass resolution of 1/300, and is still commercially available.

There have been a number of variations on this instrument. Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VanBreeman, R. B.: Snow, M.: Cotter, R. J., Int. *J. Mass Spectrom. Ion Phys.* 49 (1983) 35.; Tabet, J. C.; Cotter, R. J., *Anal. Chem.* 56 (1984) 1662; Olthoff, J. K.; Lys, I.: Demirev, P.: Cotter, R. J., *Anal. Instrumen.* 16 (1987) 93) modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1–5 microsecond) beam of 5 keV cesium ions, a liquid sample matrix, a symmetric push/pull arrangement for pulsed ion extraction (Olthoff, J. K.; Cotter, R. J., *Anal. Chem.* 59 (1987) 999–1002.; Olthoff, J. K.; Cotter, R. J., *Nucl. Instrum. Meth. Phys. Res. B*-26 (1987) 566–570. In both of these instruments, the time delay range between ion formation and extraction was extended to 5–50 microseconds, and was used to permit metastable fragmentation of large molecules prior to extraction from the source. This in turn reveals more structural information in the mass spectra.

The plasma desorption technique introduced by Macfarlane and Torgerson in 1974 (Macfarlane, R. D.; Skowronski, R. P.; Torgerson, D. F., *Biochem. Biophys. Res Commoun.* 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to $U_o$/eV, where the initial kinetic energy, $U_o$ is of the order of a few electron volts. Plasma desorption mass spectrometers have been constructed at Rockefeller (Chait, B. T.; Field, F. H., *J. Amer. Chem. Soc.* 106 (1984) 193), Orsay (LeBeyec, Y.; Della Negra, S.; Deprun, C.; Vigny, P.; Giont, Y. M., *Rev. Phys. Appl.* 15 (1980) 1631), Paris (Viari, A.; Ballini, J. P.; Vigny, P.; Shire, D.; Dousset, P., *Biomed. Environ. Mass Spectrom,* 14 (1987) 83), Upsalla (Hakansson, P.; Sundqvist B., Radiat. Eff. 61 (1982) 179) and Darmstadt (Becker, O.; Furstenau, N.; Krueger, F. R.; Weiss, G.; Wein, K., *Nucl. Instrum. Methods* 139 (1976) 195). A plasma desorption time-of-flight mass spectrometer has been commercialized by BIO-ION Nordic (Upsalla, Sweden). Plasma desorption utilizes primary ion particles with kinetic energies in the MeV range to induce desorption/ionization. A similar instrument was constructed at Manitobe (Chain, B. T.; Standing, K. G., Int. *J. Mass Spectrum. Ion Phys.* 40 (1981) 185) using primary ions in the keV range, but has not been commercialized.

Matrix-assisted laser desorption, introduced by Tanaka et al. (Tanaka, K.; Waki, H.; Ido, Y.; Akita, S.; Yoshida, Y.; Yoshica, T., *Rapid Commun. Mass Spectrom.* 2 (1988) 151) and by Karas and Hillenkamp (Karas, M.; Hillenkamp, F., *Anal. Chem.* 60 (1988) 2299) utilizes TOFMS to measure the molecular weights of proteins in excess of 100,000 daltons. An instrument constructed at Rockefeller (Beavis, R. C.; Chait, B. T., *Rapid Commun. Mass Spectrom.* 3 (1989) 233) has been commercialized by VESTEC (Houston, Tex.), and employs prompt two-stage extraction of ions to an energy of 30 keV.

Time-of-flight instruments with a constant extraction field have also been utilized with multi-photon ionization, using short pulse lasers.

The instruments described thus far are linear time-of-flight spectrometers. That is, there is no additional focusing after the ions are accelerated and allowed to enter the drift region. Two approaches to additional energy focusing have been utilized: those which pass the ion beam through an electrostatic energy filter and those which use an ion mirror.

The reflectron (or ion mirror) was first described by Mamyrin (Mamyrin, B. A.; Karatajev. V. J.; Shmikk, D. V.; Zagulin, V. A., *sov. Phys.,* JETP 37 (1973) 45). As depicted in FIG. 2, the operation of the reflectron is in effect the same as that of the ion accelerator discussed above. Ions are assumed to start at an object or image plane located at $P_2$. Ions are assumed to start at plane $P_2$ having already been accelerated to their full kinetic energy and moving toward the reflectron. After having traveled some distance, $D_2$, in a field free region, the ions enter the reflectron. The electrostatic field within the energized reflectron slows the ions to a stop at a distance s from the entrance of the reflectron. Ions are then re-accelerated toward image plane $P_3$ and to their original kinetic energy by the reflectron's electrostatic field. After exiting the reflectron, the ions travel a distance $D_2$ to image plane $P_3$. Within a certain kinetic energy range, all ions of a given m/q, having started at plane $P_2$ simultaneously, will arrive at image plane $P_3$ at substantially the same time. Improved mass resolution results from the fact that ions with larger kinetic energies must penetrate the reflecting field more deeply before being turned around. These faster ions then catch up with the slower ions at the detector and are thus temporally focused.

For the purpose of the present discussion, it is assumed that ions are accelerated in a single region of the reflectron and that the electric field strength is uniform throughout this region. In such a case, the relationship between $D_1$, $D_2$, and s is given by:

$$D_1+D_2=4s \quad (4)$$

If $D_1=D_2=D$ then as in the discussion of the Wiley-Maclaren accelerator above, D=2s.

As with the Wiley-Maclaren accelerator, the reflectron might consist of more than one acceleration “stage”. Such multistage reflectrons have been discussed extensively in the technical literature. See, for example, U. Boesl, R. Weinkauf, and E. W. Schlag, Int. *J. Mass Spectrom. Ion Process.,* 112, 121(1992). Multistage reflectrons have the advantage that they can temporally focus ions of a broader range of kinetic energies.

The Wiley-Maclaren accelerator and Mamyrin reflectron may be combined in a single instrument as depicted in FIG. 3. Here, ions start at object plane, $P_1$, in a single stage accelerator. The ions are accelerated and space focused to image plane, $P_2$. As discussed with respect to FIG. 1, due to space focusing all ions of a given m/q pass through plane $P_2$ at substantially the same time. From this point, the distribution of ion kinetic energies would result in a temporal defocusing of the ions and a loss in mass resolution. However, image plane $P_2$ may be treated as the starting point for ions passing through the reflectron. As discussed with respect to FIG. 2, the reflectron can focus ions from image plane $P_2$ to image plane $P_3$. If a detector is placed at $P_3$ then all ions of a given m/q will be temporally focused so that they arrive at the detector at substantially the same time and will thereby provide the optimum mass resolution.

Reflectrons were used on the laser microprobe instrument introduced by Hillenkamp et al. (Hillenkamp, F.; Kaufmann, R.; Nitsche, R.; Unsold, E., *Appl. Phys.* 8 (1975) 341) and commercialized by Leybold Hereaus as the LAMMA (LAser Microprobe Mass Analyzer). A similar instrument was also commercialized by Cambridge Instruments as the IA (Laser Ionization Mass go Analyzer). Benninghoven (Benninghoven reflectron) has described a SIMS (secondary ion mass spectrometer) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler, B.; Tang, X.; Westmore, J. B.,*Anal. Instrumen.* 16 (1987) 173).

Lebeyec (Della-Negra, S.; Lebeyec, Y., in Ion Formation from Organic Solids IFOS III, ed. by A. Benninghoven, pp 42–45, Springer-Verlag, Berlin (1986)) described a coaxial reflectron time-of-flight mass spectrometer that reflects ions along the same path in the drift tube as the incoming ions, and records their arrival times on a channelplate detector with a centered hole that allows passage of the initial (unreflected) beam. This geometry was also utilized by Tanaka et al. (Tanaka, K.; Waki, H.; Ido, Y.; Akita, S.; Yoshida, T., *Rapid Comun. Mass Spectrom.* 2 (1988) 151) for matrix assisted laser desorption. Schlag et al. (Grotemeyer, J.; Schlag, E. W., *Org. Mass Spectrom.* 22 (1987) 758) have used a reflectron on a two-laser instrument. The first laser is used to ablate solid samples, while the second laser forms ions by multiphoton ionization. This instrument is currently available from Bruker. Wollnik et al. (Grix., R.; Kutscher, R.; Li, G.; Gruner, U.; Wollnik, H., *Rapid Commun. Mass Spectrom.* 2 (1988) 83) have described the use of reflectrons in combination with pulsed ion extraction, and achieved mass resolutions as high as 20,000 for small ions produced by electron impact ionization.

A dual-reflectron time-of-flight mass spectrometer has been previously described by Cotter et al. (Cotter, R. J. and Cornish, T. J.; U.S. Pat. No. 5,202,563 and Cornish, T. J., and Cotter, R. J., Time of Flight Mass Spectrometry, R. J. Cotter ed., American Chemical Society, Washington, D.C., 1994). The instrument described comprises an ion source wherein ions are generated and then accelerated towards a first reflectron. An electrostatic field generated by the energized reflectron reflects ions towards a second reflectron. Similarly, the second reflectron reflects ions toward an ion detector. Cotter et al. demonstrated that in one particular instance the mass resolving power of the spectrometer observed when using the instrument as described above is about double that observed when using only a single reflectron. Notably, however, the spectrometer described by Cotter et al. is limited to two reflections as only two reflectrons are used and these are positioned so that ions follow a Z shaped trajectory through the instrument. Also, notable is the fact that neither of the reflectrons can be pulsed on or off in a microsecond time frame.

Additionally, Mamyrin et al. U.S. Pat. No. 4,072,862 discloses a time-of-flight mass spectrometer whose analyzer chamber accommodates a pulsed ion source, an ion detector and an ion reflecting system, all disposed on one and the same ion optical axis. Mamyrin's prior art spectrometer is his depicted in FIG. 4. Parts of the spectrometer according to the present invention resemble this arrangement superficially, however, as will be seen below, the present invention has some significant differences with regard to both means and method. Notice in the case of Mamyrin that ions are generated in a source which is integrated into the mass analyzer. The ion detector and the ion reflecting system described in Mamyrin et al. are disposed on opposite sides of the ion source that is composed of electrodes which are transparent to the ions being studied. Ions generated are accelerated out of this ion source along the axis of the analyzer via electric potentials on two or three metal planar electrodes. The ions are then reflected by a reflectron back towards the ion source. According to Mamyrin, by the time the ions arrive back at the source, the source electrodes are deenergized so that the ions can pass through the source and into the detector. However, the ion source of Mamyrin et al. is not designed in such a way as to be useful as a reflectron or reflecting device. Furthermore, Mamyrin et al. neither teach nor no suggest any method of ion analysis via multiple passes through reflecting devices.

It has been suggested by Wollnik, H., in Time-of-flight Mass Analyzers, *Mass Spec. Rev.,* 1993, 12, p.109, that two reflectrons may be configured coaxially with respect to one another in such a way that ions can be reflected back and forth between them. Wollnik's prior art spectrometer is depicted in FIG. 5. (see also, Wollnik et al., Spectral Analysis Based on Bipolar Time-Domain Sampling: A Multiplex Method for Time-of-Flight Mass Spectrometry, *Anal. Chem.,* 1992, 64, p.1601, and Herman Wollnik, UK Patent Application No. 8120809 and German Patent No. 3025764). Parts of the spectrometer according to the present invention resemble this arrangement superficially, however, as will be seen below, the present invention has some significant differences with regard to both the apparatus and method.

In the hypothetical instrument as shown in FIG. 5, Wollnik suggests that two reflectrons 50, 52 be placed coaxially with respect to one another, that an ion source 54 be placed at one end of the instrument, and that a detector 56 be placed at the other end. The ion source 54 is used to generate analyte ions in a pulsed manner. The ions are accelerated to their full analysis velocity by the ion source 54. That is, the sum of the kinetic and potential energies of the ions does not change significantly 10o between the time the ions exit the ion source 54 and the end of 1al the mass analysis. Ions exit the ion source 54 fully accelerated and pass through the reflectron 50 (the first reflectron) immediately adjacent to the ion source 54—which at the time is at ground potential.

After the ions have pass through reflectron 50, reflectron 50 is rapidly energized to a high potential. In contrast, reflectron 52, adjacent to the detector 56, is energized before and during the analysis. While both reflectrons 50, 52 are energized, ions are repeatedly reflected back and forth between them (as indicated by ion path 58). To conclude the analysis, reflectron 52 must be rapidly deenergized to ground potential so that ions are then able to pass through it and into the detector 56. However, Wollnik does not teach how a reflectron or similar device might be pulsed "ON" or "OFF".

Notice again that in Wollnik's prior art spectrometer, the reflectron is not used to accelerate ions to their analysis energy. Rather, Wollnik teaches the use of the ion source 54 to accelerate the ions. This is because Wollnik's reflectron 50 is inadequate for accelerating ions to their analysis energy but is adequate only for reflecting ions.

Consider, for example, the use of a two stage reflectron as an accelerator in a one meter spectrometer according to Wollnik's design as depicted in FIG. 5. In such a case the image plane would be about 0.5 m from the reflectron. Using equation 3 of Schlag et al. (*Int J Mass Spectrom. Ion Process.,* 112, 121(1992)) one can determine the minimum dimensions and potentials applied to the reflectron. The minimum length of the reflectron would be about 7 cm. The "front" stage would be about 1 cm long ($X_{A2}$=0.01 m in Schlag's notation) and the "back" stage would be about 6 cm long. Assuming the ions are to have a analysis kinetic energy of about 6.75 kV, and the starting position within the reflectron to be about 0.047 m from the grid separating the two accelerating stages (i.e. $X_{A1}$=0.047 m), then, the potential applied to the grid separating the two accelerating stages would be $U_{A2}$~4.59 kV and the potential applied to the back of the reflectron would be 7.332 kV so that the potential at the starting position would be U=6.75 kV. Under such circumstances, accelerating leu-enkephalin ions from rest at $X_{A1}$=0.047 m would result in a flight time of the ions to the image plane of about 14.5 microseconds. More importantly, the flight time distribution would be large—about 12 ns or more. This is by far the largest error in the measurement and would have a substantial negative impact on the resolution of the spectrometer. Indeed Schlag et al. indicate that such a device is not useful as an accelerator because "the electric field in the first stage of the [accelerator] has to be very weak, which induces a large spread in flight times, e.g. due to the 'turn around time' effect."

Also note that Wollnik does not teach how the reflectron may be pulsed rapidly to high voltage from ground or vice versa. This is an important consideration in the construction of his proposed analyzer. Assuming, for example, the flight time of ions from one reflectron to the other is about 30 μsec, then all of the electrodes of reflectron 1 must be pulsed to the appropriate high voltages in a substantially shorter time than this—e.g. 1 μsec. Also, all the electrodes of reflectron 2 must be pulsed to ground in a short time frame in order to conclude the analysis. Although one might in theory control the potential on each and every electrode of both reflectrons with its own individual pulser, such would prove impractical and costly.

Finally, notice in Wollnik's spectrometer of FIG. 5, that the instrument is limited in the ion sources that might be used with the analyzer. The only ion sources that can be used are those external to the analyzer, that produce ions in a pulsed manner (typically nanoseconds in duration), and produce ions that are already at their analysis energy when they exit the source.

The performance of the instrument is directly influenced by the duration of the ion pulses produced by the source. That is, the pulse of ions finally observed at the detector cannot be shorter in duration than the duration of the ion pulse produced at the source. As the mass resolving power of the instrument is inversely proportional to the ion pulse duration at the detector, it is clear that the duration of the ion pulse produced at the source is of critical importance in the performance of the instrument as a whole. Also, the signal-to-noise ratio and therefore the limit of detection of the instrument is related to the width of the ion pulse. Broader pulses will result in a lower signal-to-noise ratio and a lower limit of detection.

The purpose of the present invention is to provide a means and method for operating a device which can serve as an accelerator and a reflectron in a TOF mass spectrometer and which can also be energized and deenergized in a pulsed manner. It is a further purpose of the present invention to provide a means and method of operating a mass spectrometer which uses said device to accept ions from a source which is either external or internal to the analyzer and analyze them in a TOF mass analyzer wherein ions are reflected multiple times between said device and one or more reflectrons for the purpose of improving the mass resolution of the instrument. It is a further purpose of the present invention to provide a means and method of operating a mass spectrometer the resolution of which is substantially not influenced by the duration of the ion pulse produced by the ion source and wherein ions are reflected multiple times between one or more reflecting devices for the purpose of improving the mass resolution of the instrument.

Several references relate to the technology herein disclosed. For example, F. Hillenkamp, M. Karas, R. C. Beavis, B. T. Chait, *Anal. Chem.* 63(24), 1193A(1991); Wei Hang, Pengyuan Yag, Xiaoru Wang, Chenglong Yang, Yongxuan Su, and Benli Huang, *Rapid Comm. Mass Spectrom.* 8, 590(1994); A. N. Verentchikov, W. Ens, K. G. Standing, *Anal. Chem.* 66, 126(1994); J. H. J. Dawson, M. Guilhaus, *Rapid Comm. Mass Spectrom.* 3, 155(1989); M. Guilhaus, *J. Am. Soc. Mass Spectrom.* 5, 588(1994); E. Axelsson, L. Holmlid, Int. *J. Mass Spectrom. Ion Process.* 59, 231(1984); O. A. Mirgorodskaya, et al., *Anal. Chem.* 66, 99(1994); S. M. Michael, B. M. Chien, D. M. Lubman, *Anal. Chem.* 65, 2614(1993); W. C. Wiley, I. H. McLaren, *Rev. Sci. Inst.* 26(12), 1150(1955).

SUMMARY OF THE INVENTION

The present invention relates generally to time-of-flight mass spectrometers. More specifically, the invention comprises an improved method and apparatus for analyzing ions using a time-of-flight mass spectrometer. In the present invention, two or more ion reflecting devices are positioned with respect to one another such that ions generated by an ion source can be reflected back and forth between them.

The first reflecting device is an ion accelerator whose function is two-fold. First, it acts as an accelerating device and provides the initial acceleration to ions received from the ion source. Second, the accelerator acts as a reflecting device and reflects the ions in the subsequent mass analysis. As discussed above and in reference to the prior art work of Mamyrin and Wollnik, the ability of the accelerator according to the present invention to act both to accelerate the ions and reflect them in the subsequent analysis is an important feature of the instrument according to the present invention.

The second reflecting device is a reflectron and acts only to reflect ions in such a manner that all ions of a given mass-to-charge ratio have substantially the same flight time through the analyzer. During ion analysis, ions are reflected back and forth between the accelerator and reflectron(s) multiple times. At the end of the ion analysis, the accelerator is rapidly deenergized so as to allow the ions to pass through the accelerator and subsequently into a detector. Alternatively, the reflectron is rapidly deenergized so as to allow the ions to pass through the reflectron and subsequently into a detector. Alternatively, the analysis may be concluded by deflecting the ions into a detector using electrostatic deflection plates or one of the reflectrons might be rapidly deenergized so as to allow ions to pass through it and into a detector located behind it. Importantly, the elements of the accelerator and/or reflectron(s) are energized and deenergized in a pulsed manner via a resistor-capacitor (RC) divider specifically designed for this purpose.

By reflecting the analyte ions back and forth between the accelerator and the reflectron several times, a much longer flight path can be achieved in a given size spectrometer than could otherwise be achieved. Consequently, the mass resolving power of the TOF mass spectrometer taught here can be substantially greater than could otherwise be achieved in a TOF mass spectrometer of similar size.

Notice that because the present invention uses a specially designed accelerator, the present invention does not require and does not use an ion source which generates high kinetic energy ions in a pulsed manner. Rather, the present invention can employ a variety of ion sources that produce relatively low kinetic energy ions. The ion source according to the present invention may be either internal or external to the accelerator. Also, ions can be injected into the accelerator in either a pulsed, continuous, or semi-continuous manner. In contrast to Wollnik's prior art, the performance of the present invention in terms of mass resolving power is not substantially influenced by the width of the ion pulse produced by the ion source. Rather, the analysis of the ions is initiated when the accelerator is pulsed "ON". That is, the pulsing of the accelerator forms the ions into a well defined ion pulse. By pulsing the accelerator "ON" for about 100 ns, the ions can be formed into a pulse which is on the order of a 2ns duration regardless of the duration of the ion pulse provided by the source.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily all understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The following presents a detailed description of a preferred embodiment of the present invention, as well as some alternate embodiments of the invention. As discussed above, the present invention relates generally to the mass spectroscopic analysis of chemical samples and more particularly to time-of-flight mass spectrometry. Specifically, an apparatus and method are described for the analysis of ionized species in a spectrometer comprising two or more reflecting devices such that ions can be reflected back and forth a plurality of times therebetween. Reference is herein made to the figures, wherein the numerals representing particular parts are consistently used throughout the figures and accompanying discussion.

Figure 6:
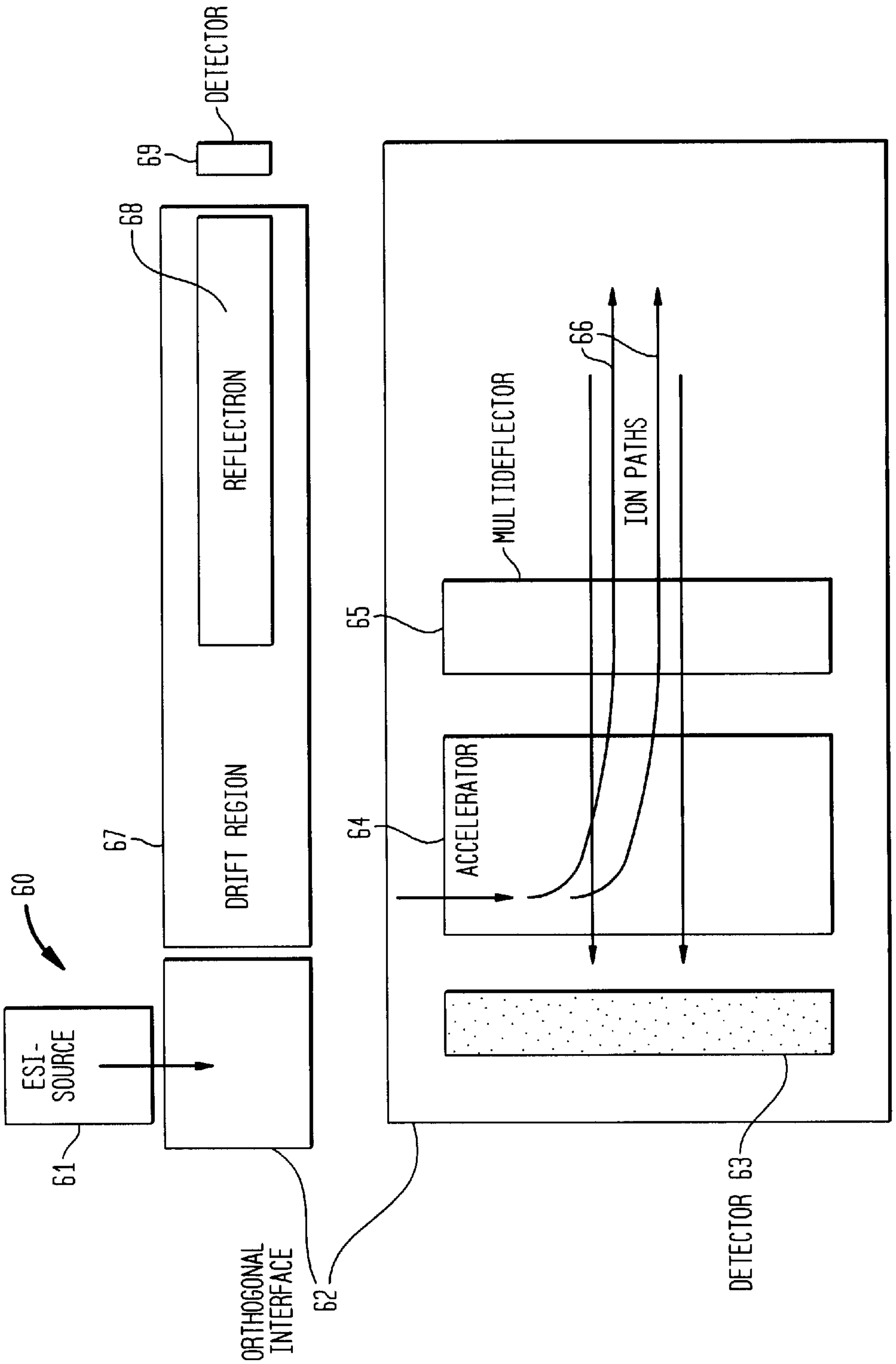
FIG. 6 shows a block diagram of a preferred embodiment of a mass spectrometer according to the present invention.

With reference first to FIG. 6, shown is a block diagram depiction of a mass spectrometer analyzer 60 according to a preferred embodiment of the present invention. The analyzer 60 shown comprises an "orthogonal interface" 62, a vacuum chamber 67, and a single stage reflectron 68 all oriented coaxially with one another. The orthogonal interface 62 accepts ions from an external ion source 61, for example an electrospray ionization (ESI) source, and accelerates them toward a reflectron 68 and ultimately detects them via detector 63 or 69. A variety of other sources might be used including sources that operate entirely under vacuum and those in which ions are formed at elevated pressures. These include, for example, a matrix assisted laser desorption ionization source, a chemical ionization source, an electron ionization source, an atmospheric pressure chemical ionization source, or a secondary ionization source. Also, the ion source might include an ion as described by C. M. Whitehouse and Erol Culcicek in U.S. Pat. No. 5,652,427 and ion storage as described by T. Dresch in U.S. Pat. No. 5,689,111.

Furthermore, rather than accept ions directly from an ion source 61, the orthogonal interface 62 might instead accept ions from some other device interposed between the ion source 61 and the orthogonal interface 62. For example, one might analyze ions from an ion source using a quadrupole analyzer before injecting them into the orthogonal interface. Further, one might dissociate ions from the ion source and use the TOF analyzer to analyze the products of the dissociation.

The preferred embodiment of the orthogonal interface 62 comprises a single stage accelerator 64 and a detector 63 positioned behind the accelerator 64. In addition, a preferred embodiment of the mass spectrometer according to the present invention further comprises a "multideflector" 65 according to U.S. Pat. No. 5,696,375.

In the preferred embodiment, ions enter the accelerator 64 in a direction orthogonal to the axis of the analyzer 60 while the accelerator 64 is being held at ground potential. The accelerator 64 is then pulsed to a high voltage to accelerate the ions along the axis of the analyzer and in the direction of the reflectron 68. However, after acceleration, the ions still have their initial kinetic energy in the orthogonal direction. A multideflector 65 is used to deflect the ions onto a trajectory which is truly parallel to the axis of the analyzer 60. The ions then drift through the field free region 67 of the analyzer 60 until encountering the reflectron 68. In the reflectron 68, the ions are reflected back toward the orthogonal interface 62. The potential on the accelerator 64 is again held at ground by the time the ions arrive back at the orthogonal interface 62. The ions are thus able to pass unhindered through the accelerator 64 and into the detector 63.

Not shown in FIG. 6 are the electronics required to control and provide power to the various elements in the spectrometer. Specifically, high voltage power supplies and pulsers, timing pulsers, an oscilloscope or other similar device, and computers—all of which are commonly known in the industry and commercially available.

Figure 4:
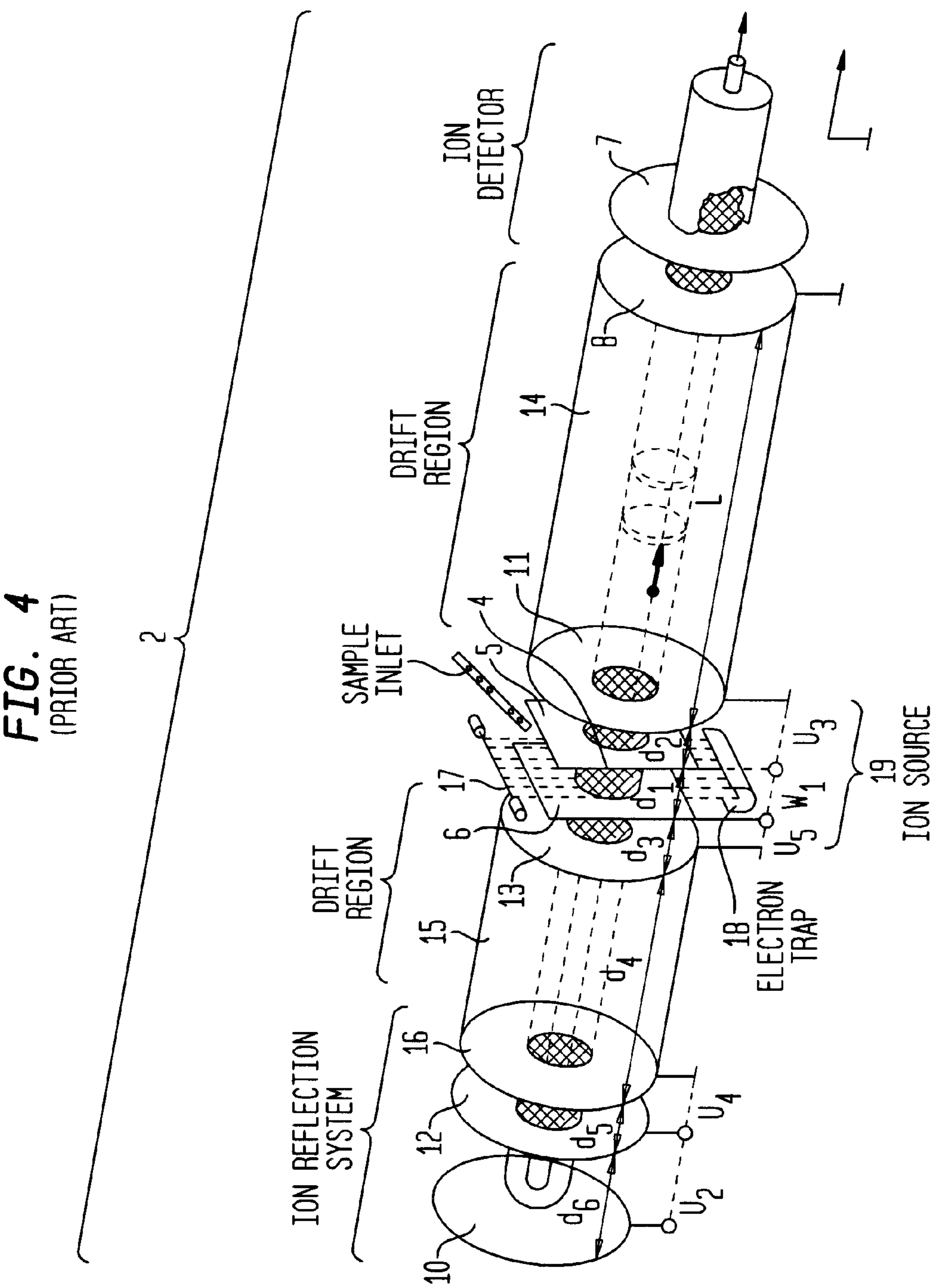
FIG. 4 (PRIOR ART)
FIG. 4 shows a prior art mass spectrometer as disclosed by Mamyrin et al.
Figure 5:
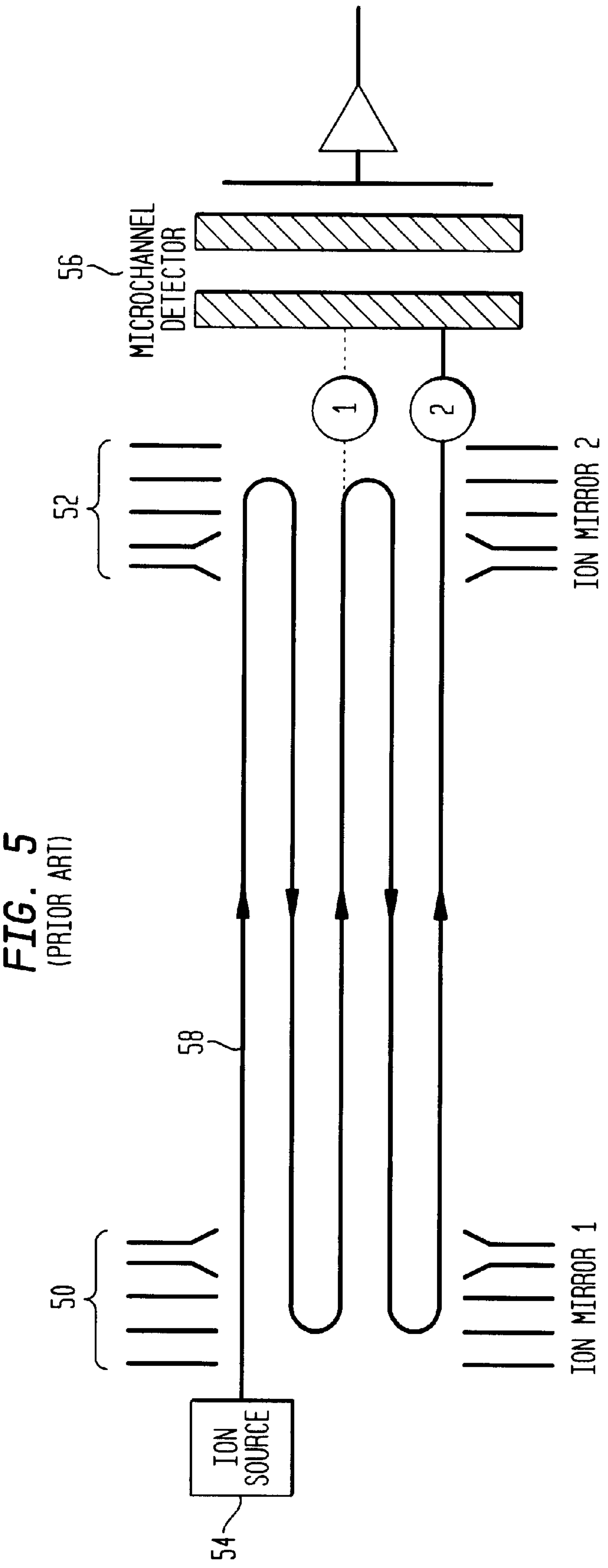
FIG. 5 (PRIOR ART)
FIG. 5 shows a prior art mass spectrometer as disclosed by Wollnik.

The preferred embodiment according to the present invention is similar to Mamyrin's prior art spectrometer shown in FIG. 4 and discussed herein with regards to FIG. 4. However, there are some important differences between the prior art spectrometer of Mamyrin and the present invention. The Mamyrin spectrometer, for example, uses an ion source which is integral to the mass analyzer. In contrast, the ion source according to the preferred embodiment of the present invention is external to the mass analyzer. The ion source of the present invention forms ions into a low energy beam and injects them into the analyzer in a direction which is orthogonal to the direction in which the TOF mass analysis is to occur. For the purpose of this discussion, "low energy" means that the ions have a kinetic energy which is small in comparison to the kinetic energy the ions will have once Air they have been accelerated by the accelerator. For example, the ions produced by the ion source might initially have kinetic energies of 10 eV/ion, but once the ions are accelerated by the ion source they might have kinetic energies of 10,000 eV/ion. The use of external ion sources in the present invention represents an enhancement in flexibility over prior art.

The ion accelerator according to the present invention is also substantially different from Mamyrin's accelerating electrodes. Mamyrin used at most three accelerating electrodes. In FIG. 4 these are labeled 5, 6, and 13. A pulsed electrical potential is applied only to electrode 5. The remaining two are held at a DC potential. Mamyrin describes ion formation as occurring between electrodes 5 and 6. Therefore, Mamyrin teaches that the distance "between the electrodes . . . must be as small as possible but still 3 to 5 times the width of the ion formation region." Clearly then, the distribution of starting positions of the ions within the source region would be between ⅕ and ⅓ of the gap between electrodes 5 and 6. When the electrical potential on electrode 5 is pulsed, the potential energy of the ions between electrodes 5 and 6 are abruptly changed. The potential energy of a given ion at this point in time is directly dependent on its position with respect to electrodes 5 and 6. Ions closer to electrode 5 at the time of the pulse will have a higher potential energy than those further away from electrode 5.

Figure 2:
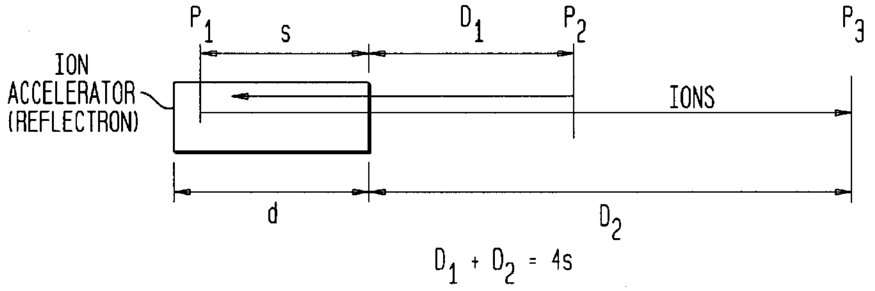
FIG. 2 (PRIOR ART)
FIG. 2 illustrates the geometry associated with a prior art reflectron.
Figure 3:
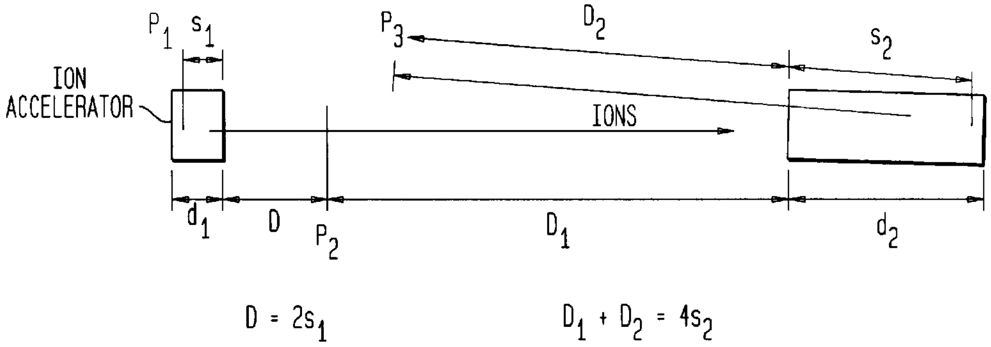
FIG. 3 (PRIOR ART)
FIG. 3 illustrates the geometry associated with a prior art instrument which employs the prior art accelerator of FIG. 1 and the prior art reflectron of FIG. 2.

Thus, the broad spatial distribution taught by Mamyrin leads to a broad potential energy distribution and ultimately a broad kinetic energy distribution in the ions under analysis. As discussed with reference to FIGS. 2 and 3, it is possible to use a reflectron to temporally focus the ions. However, the distribution of kinetic energies that can be focused by a given type of reflectron is limited. As discussed above with regard to FIG. 2, a single stage reflectron can focus ions over a kinetic energy range of less than 5% of the nominal ion energy. For example, to focus ions in the preferred embodiment of the present invention to a flight time distribution of about 1 ns from plane $P_2$ to plane $P_3$, it is necessary that the kinetic energy of the ions vary by no more than 150 eV out of a nominal 7,000 eV kinetic energy beam.

The accelerator according to the present invention is therefore intended to be as long as possible while considering other factors such as electric field strength and the initial ion energy distribution. By making the accelerator as long a possible, the final kinetic energy distribution of the ions due to their initial spatial distribution will be minimized. However, as discussed by Wiley and Maclaren, because the ions initially have a small amount of kinetic energy directed along the axis of TOF analyzer, the ions will have a distribution of flight times to the image plane $P_2$. The reflectron cannot compensate for this distribution of flight times. To reduce this effect, one must reduce the ion's initial energy distribution or increase the field strength in the accelerator. The lower the accelerating field strength, the more significant the distribution in ion flight times will be.

To maintain the accelerating field strength and increase the length of the accelerator, the potential applied to the accelerator should be as high as possible. For example, in the preferred embodiment of the accelerator according to the present invention, the length of the accelerator is about 60 mm whereas the distribution of initial positions of the ions around the object plane $P_1$ is about 1 mm. This results in an energy distribution of about 1/60=1.7% of the nominal ion kinetic energy. To reduce the effect of the initial ion kinetic energy, the potential applied to the accelerator is as high as practical, for example, 10 kV.

Having a long accelerator has the additional advantage that it reduces the influence of the "fringe" field at the entrance of accelerator on the trajectory of the ion beam. As in the Mamyrin prior art, the preferred embodiment of the accelerator according to the present invention is bounded at either end by planar conducting mesh. Ions are accelerated from their starting positions at plane $P_1$ to the end of the accelerator where they pass through the conducting mesh and into the field free drift region of the spectrometer. Ideally, on the accelerator side of the conducting mesh is the accelerating electrostatic field and on the opposite side is a field free region. However, because the mesh is essentially a grid work of metal wires, the accelerating electrostatic field can to some degree penetrate through the small holes of the mesh. Near the holes in the mesh, the field is thus distorted and the distorted accelerating field can deflect the ions from the axis of the analyzer and onto a trajectory where the flight time will be distorted or the ion will be lost. Such deflection is dependent on the kinetic energy of the ion when it encounters the mesh and on the field strength in the accelerator. By having a long accelerator the field strength can be maintained while increasing the ion's kinetic energy at the mesh. Thus, having a long accelerator reduces the influence of the mesh on the trajectory of the ions.

Figure 7:
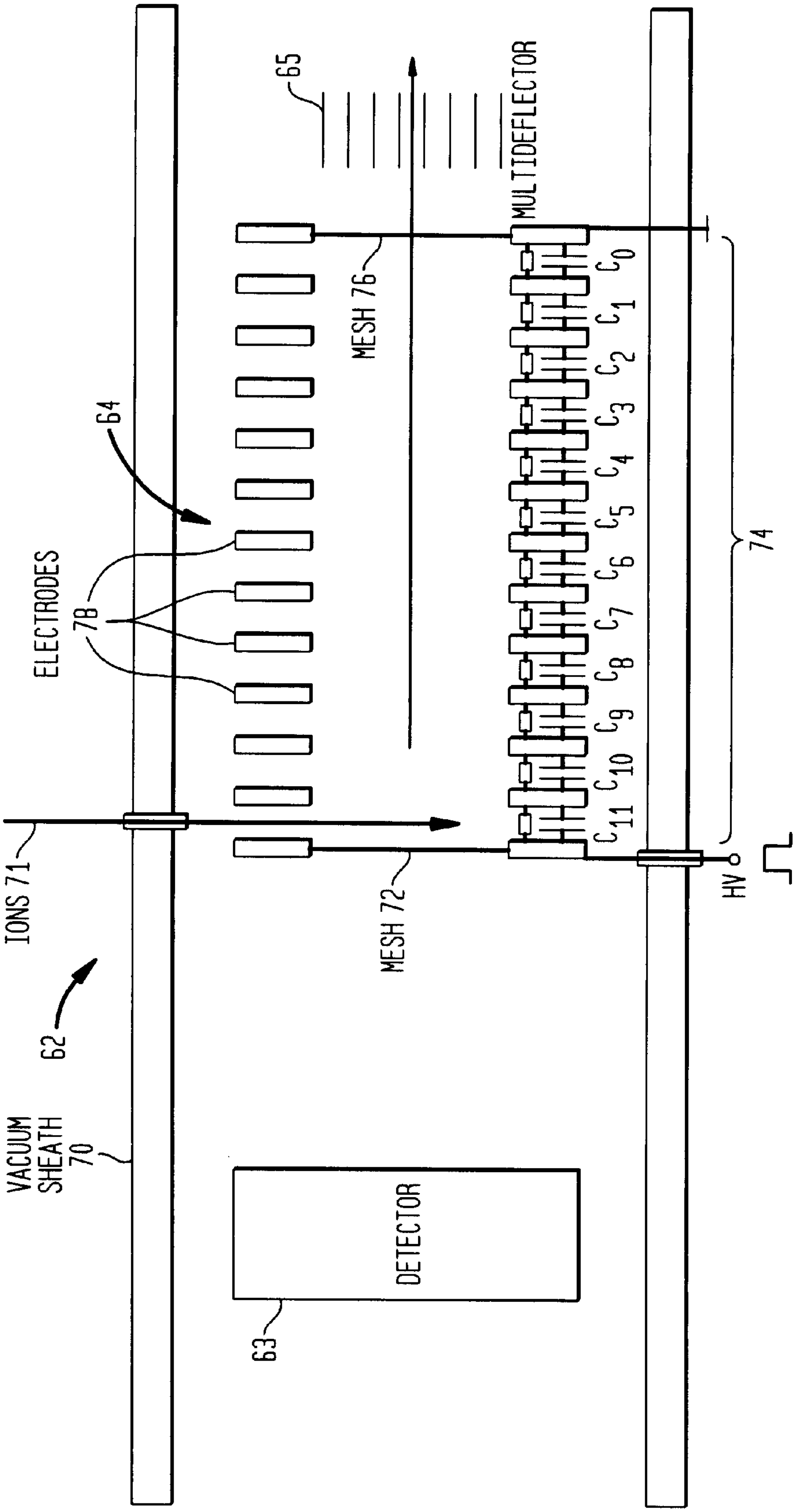
FIG. 7 shows a diagram of a preferred embodiment of an orthogonal interface according to the present invention.

Turning next to FIG. 7, shown is a cross-sectional view of the preferred embodiment of the orthogonal interface 62. The vacuum sheath 70 is preferably an electrically conducting tube. It serves to separate the vacuum of the orthogonal interface 62 from that of the ion source 61. Also, the vacuum sheath 70 provides a grounded conducting surface that acts to electrically shield the orthogonal interface 62 and produce a reproducible capacitance between ground and the accelerator electrodes 78. As discussed below, the stray capacitance between the accelerator electrodes 78 and ground can be an important consideration in the production of a uniform accelerating field. Preferably, the electrodes 78 of the accelerator 64 are stainless steel rings. Conducting mesh 71, 76 (91% transmission, 70 lines/inch) is supported on the rings at either end of the accelerator 64. The gridless steel rings (electrodes 78) (eleven (11) are shown) together with the two (2) gridded rings (mesh 72, 76) are spaced at regular intervals along the axis of the accelerator 64. Adjacent electrodes are electrically connected to one another by capacitors and resistors 74, as depicted in FIG. 7. That is, a single resistor connects two adjacent electrodes and a single capacitor in parallel to the resistor also connects these two electrodes. The resistors used in the preferred embodiment have a resistance of about 5 Mohms, and the capacitors have a capacitance of about 560 pF.

Ions 71 enter the accelerator 64 near its end which is adjacent to the detector 63 while both ends of the accelerator 64 are held at ground potential. Once ions are in the accelerator 64, one end of the accelerator 64 is pulsed to a high voltage. The potential applied to the end of the accelerator is divided by the capacitors and resistors 74 so that each electrode 78 of the accelerator 64 has a potential applied to it according to its position within the accelerator 64. That is, if the electrode nearest the multideflector 65 is held at ground potential and the electrode nearest the detector 63 is pulsed to, for example, 10 kV, then the electrode adjacent to that closest the detector 63 should be pulsed by the RC divider 74 to 10 kV*11/12=9.16 kV because it is located at a position $^{11}/_{12}{}^{th}$ of the distance between the grounded electrode and the pulsed electrode. Similarly, the electrode midway between the grounded and pulsed electrodes should be pulsed through the RC network 74 to a potential of 10 kV*6/12=5 kV. In this way a uniform electrostatic field can be produced within the accelerator 64. Notice that when the potential on the end of the accelerator 64 is brought back to ground, all the electrodes 78 of the accelerator 64 are simultaneously brought back to ground potential by the RC divider 74. Thus, ions returning from the Hill reflectron 68 after the accelerator 64 is brought back to ground potential will encounter no electric field in the accelerator 64 and will pass unhindered into the detector 63.

Care must be taken when determining the optimum capacitances of the capacitors used in the accelerator 64. Particularly, the "stray" capacitance between the electrodes 78 of the accelerator 64 and nearby conductors can have a substantial influence on the is division of the applied pulsed voltage. In the preferred embodiment, for example, the capacitance between each electrode 78 and the vacuum sheath 70 is about 0.7 pF. As a result, if the capacitance of all the capacitors, $C_0$–$C_{11}$ were to be a fixed value, for example 530 pF, the field gradient produced would be non-uniform having a high field gradient near the pulsed end of the accelerator 64 and a lower field gradient near the grounded end of the accelerator 64. Once the capacitance between the electrodes 78 and ground (i.e. the vacuum sheath) is known, it is a trivial matter to calculate from elementary physics the correct capacitance for each of the capacitors so that a uniform field is produced. For example, if it is assumed that each of the electrodes 78 of the accelerator 64 has the same capacitance with the vacuum sheath 70, CV, then it is easy to show that the capacitance of the capacitors required to produce a homogeneous field in the accelerator 64 is given by:

$$C_j = C_0 + \sum_{i=1}^{j} iC_v \tag{5}$$

Figure 8:
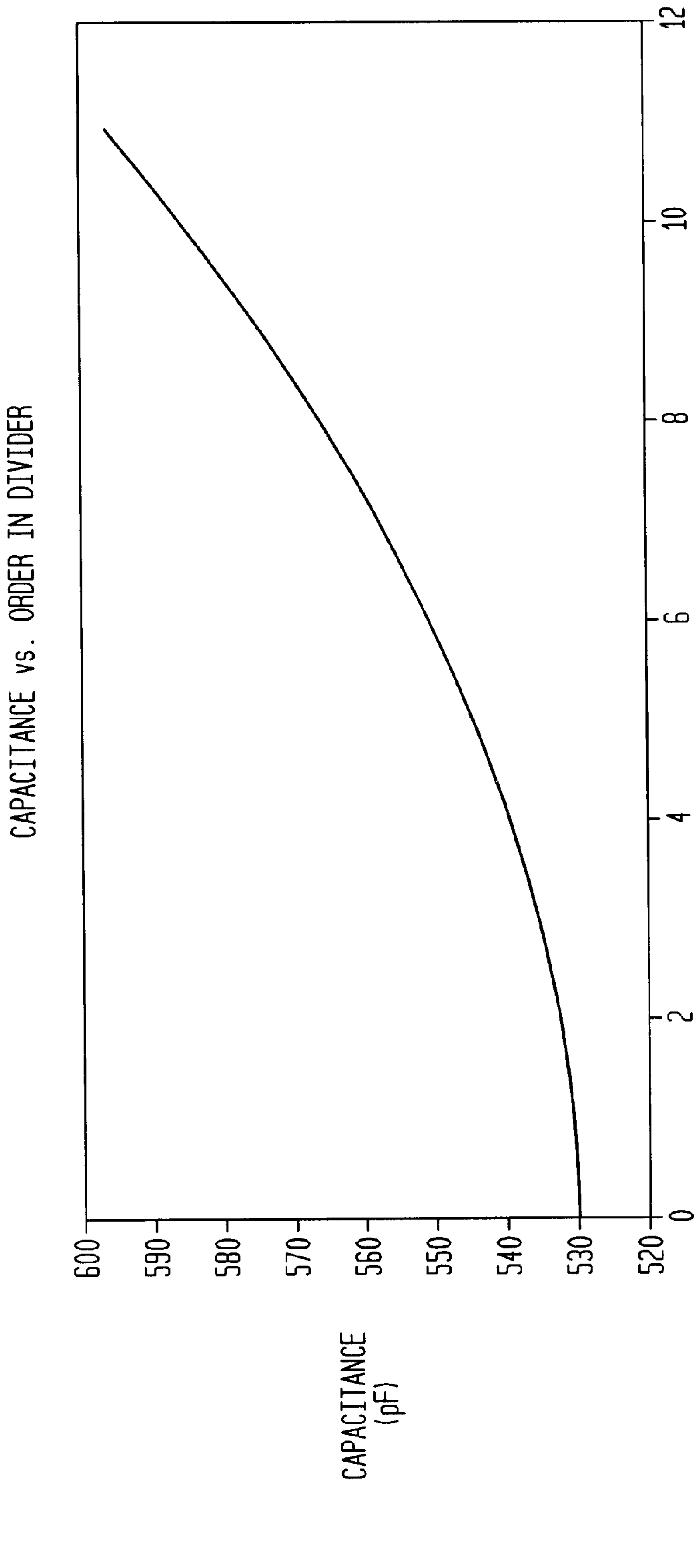
FIG. 8 shows a plot of the capacitance of the capacitors of the RC divider used in conjunction with the accelerator as a function of their order in the accelerator in accordance with the present invention.

Assuming $C_v$=1 pF, and $C_0$=530 pF, one obtains capacitances as plotted in FIG. 8.

In fact it is possible by assuming an appropriate value for $C_v$ to determine the capacitance values necessary to produce a field that not only accelerates the ions but also provides limited lateral focusing. The actual capacitance between each electrode 78 and the vacuum sheath 70 is about 0.7 pF. By assuming a value of 1 pF for $C_v$ instead of 0.7 pF, the calculated capacitances will be greater than necessary to produce a uniform field. Instead the field will be weaker near the detector 63 end of the accelerator 64 and stronger near the multideflector 65 end. This results in an electric field component which acts normal to the axis of the accelerator 64 and deflects the ions toward the axis of the accelerator 64. Having a small amount of such lateral focusing does not significantly influence the flight time of the ions but can improve the transmission efficiency of ions to the reflectron 68 and back.

To produce a uniform field that can be turned "ON" and "OFF" in a pulsed manner using prior art methods and only one high voltage pulser would require that one use two and only two electrodes in an arrangement similar to that of Mamyrin as discussed in reference to FIG. 4. In an accelerator similar to Mamyrin's prior art accelerator only one electrode is pulsed whereas the other is held at a fixed potential. In order to produce a uniform accelerating field the spatial extent of the accelerating electrodes normal to the axis of the analyzer is large compared to the gap between the electrodes. To increase the length of the accelerator and maintain a uniform field, the extent of the accelerating electrodes normal to the analyzer axis must be increased. For example, if the length of the accelerator was to be increased to 60 mm the extent of the electrodes normal to the analyzer axis would have to be increased to about 200 mm in diameter. Thus, the accelerator 64 according to the present invention has the advantage over prior art that it can be used to produce a uniform, switchable accelerating field using a single pulser wherein the spatial extent of the accelerating field in the direction of acceleration is large in comparison to the initial spatial extent of the ion beam and wherein the extent of the accelerator 64 normal to the axis of the accelerator 64 is not large in comparison to its extent along its axis.

Figure 9:
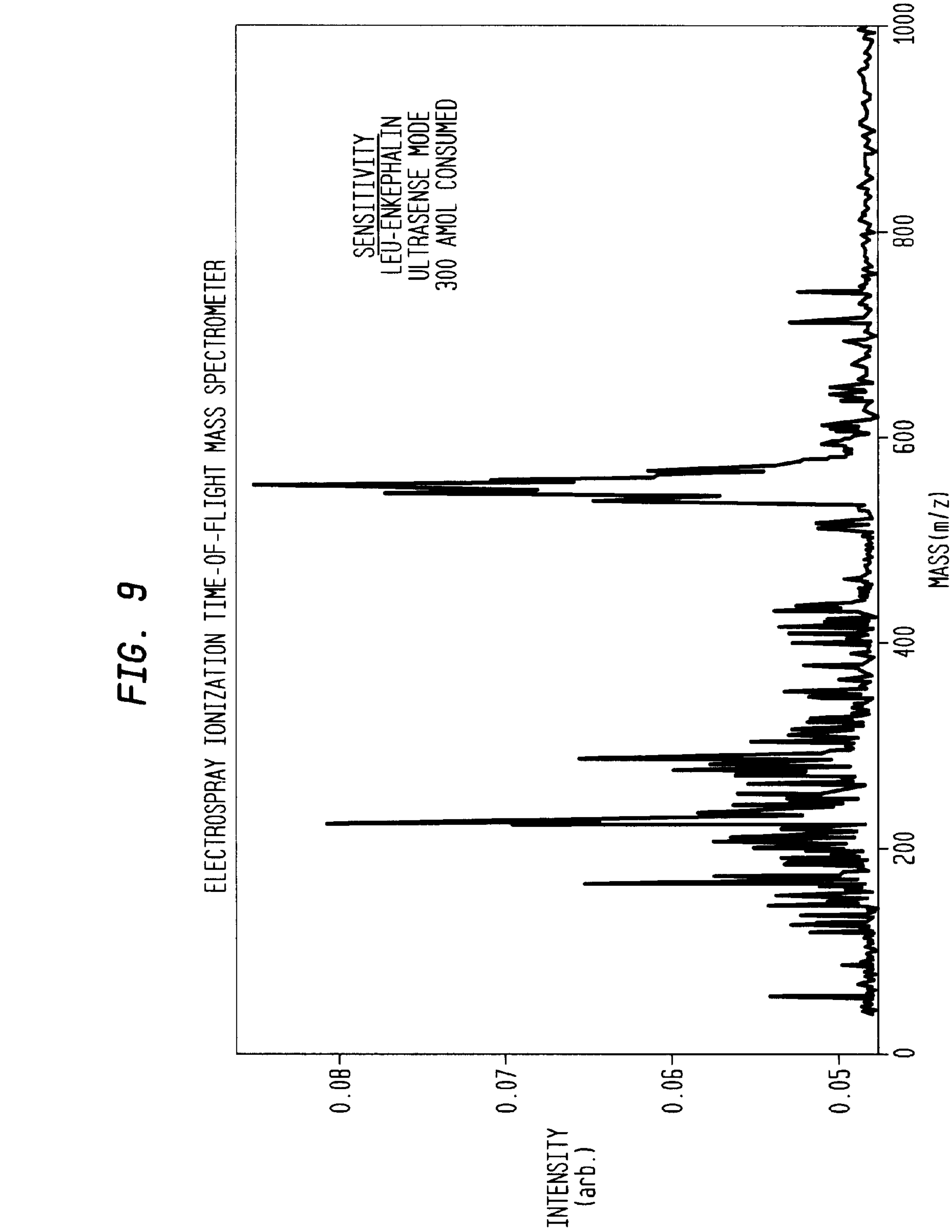
FIG. 9 shows a spectrum obtained via the survey method of operation of a mass spectrometer according to a preferred embodiment of the present invention.

While FIG. 7 depicts a high voltage pulse being applied to the end of the accelerator 64 adjacent to the detector 63 and ground as being applied to the end of the accelerator 64 adjacent to the multideflector 65, it should be understood that any combination of DC and pulse voltages could be applied to either end of the accelerator 64. For example, by holding the detector 63 end of the accelerator 64 at ground and pulsing the multideflector 65 end of the accelerator 64 to a high voltage, ions starting near the detector 63 end of the accelerator 64 are accelerated directly into the detector 63. Or by applying a lesser pulsed voltage to the detector 63 end of the accelerator 64 and a greater pulsed voltage to the multideflector 65 end of the accelerator 64, one can accelerate ions through two acceleration stages—one within the accelerator 64 itself and a second between the end of the accelerator 64 and the detector 63. It is possible thus to space focus the ions in the manner taught by Wiley and Maclaren. Because in this mode of operation, ions are accelerated directly into the detector 63, it is possible to achieve a higher sensitivity than in reflectron mode where ions travel to the reflectron 68 and back. An example of such a "survey spectrum" is shown in FIG. 9 for a sample of leu-enkephalin.

In "reflectron mode", a high voltage pulse is applied to the accelerator 64 as shown in FIG. 7 so that ions are accelerated toward the reflectron 68. When operating the instrument in a manner similar to that taught by Mamyrin, one would lower the potential on the accelerator 64 to ground after the ions of interest have been fully accelerated and before ions of interest have returned from the reflectron 68. However, by maintaining the potential on the accelerator 64 for a longer period of time, ions returning from the reflectron 68 can be reflected by the accelerator 64 back toward the reflectron 68. In this manner, the ions may be reflected multiple times between the reflectron 68 and the accelerator 64. To complete the analysis, the accelerator 64 is deenergized so that ions may pass through it and into the ion detector 63. Alternatively, the reflectron 68 may be deenergized so that ions may pass through it and into the ion detector 69. Assuming the appropriate voltages and timing are used, one can obtain higher resolution spectra by having multiple reflections rather than the single reflection by the reflectron 68.

Figure 10:
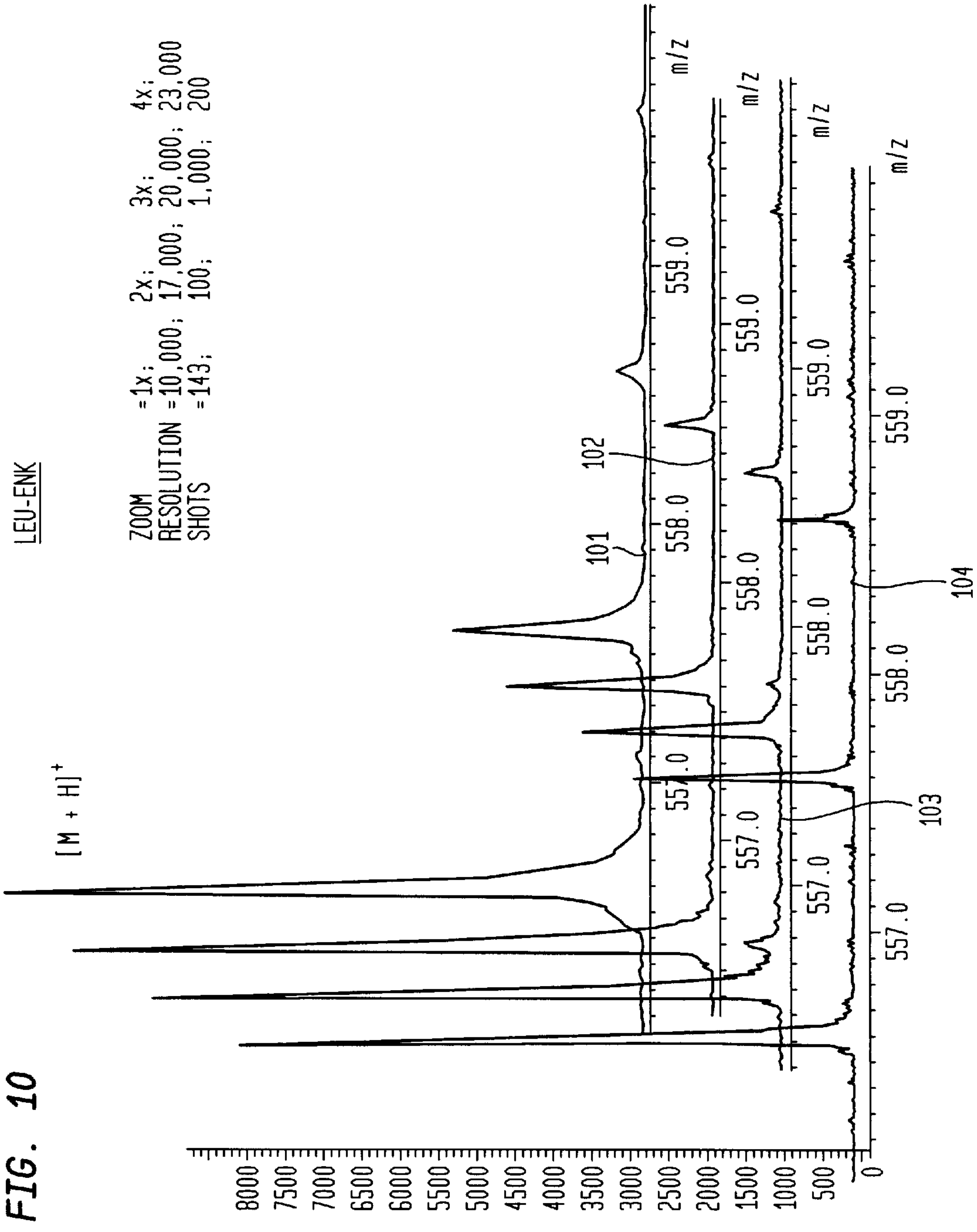
FIG. 10 shows a plot of four mass spectra of leu-enkephalin obtained using amass spectrometer instrument in accordance with a preferred embodiment of the present invention.

Example spectra of leu-enkephalin obtained in reflectron mode are shown in FIG. 10. The first spectrum 101 of leu-enkephalin was obtained with a single reflection of the ions by the reflectron. The second spectrum 102 was obtained via a reflection of the ions by the reflectron followed by a reflection by the accelerator and then a second reflection by the reflectron.

Figure 11:
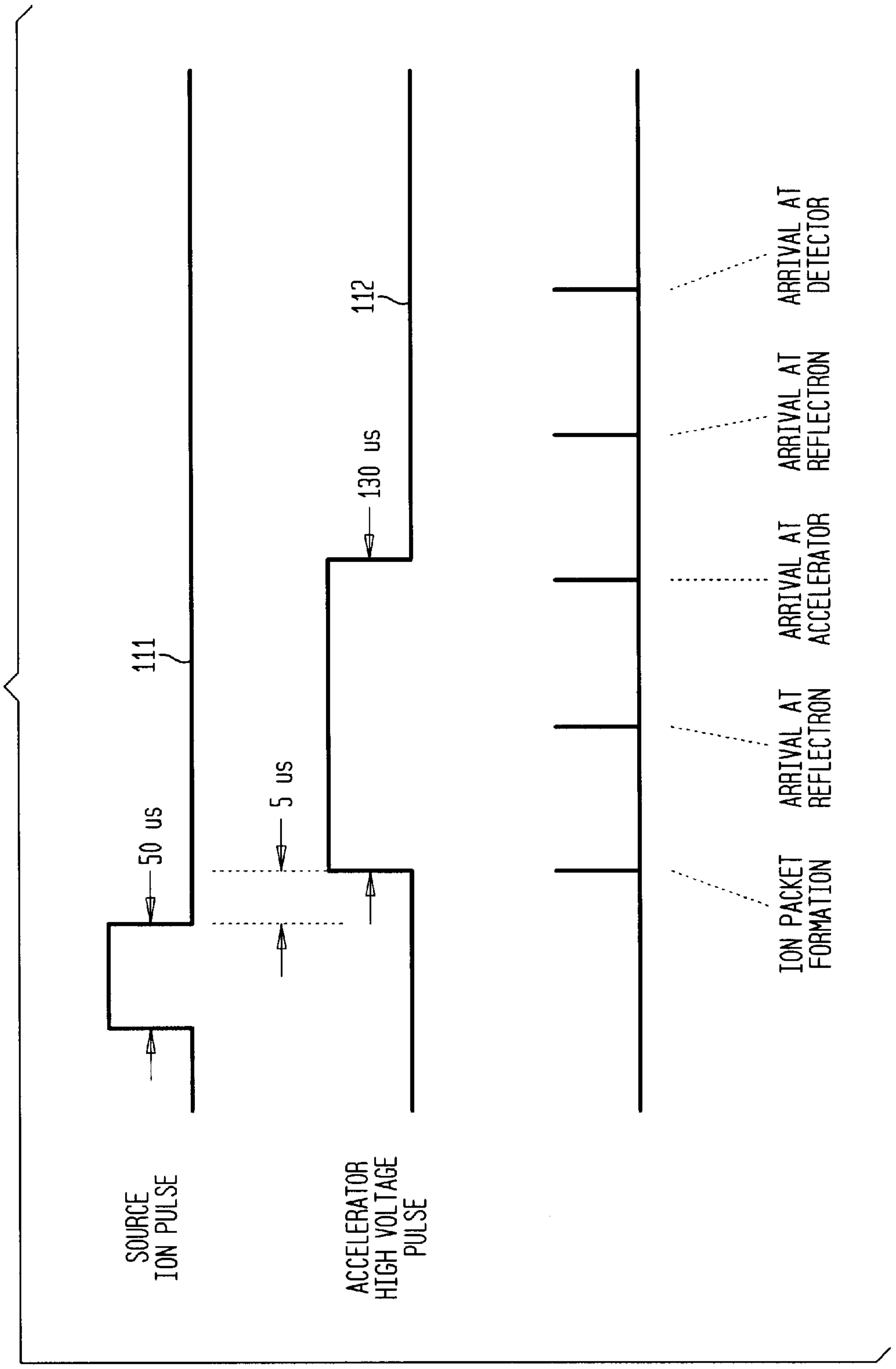
FIG. 11 illustrates a timing diagram showing the sequence of events which may occur in an example ion analysis using a mass spectrometer in accordance with a preferred embodiment of the present invention.

The timing of this experiment is illustrated in FIG. 11. In the first trace 111, "Source Ion Pulse", a pulse of ions is generated by the ion source 61. The ions travel from the source 61 to the orthogonal interface 62 and into the accelerator 64. Then, as shown in the second trace 112, the "Accelerator High Voltage Pulse" trace, the accelerator 64 is pulsed to and maintained at a high voltage for some predetermined period of time—in this example 130 us. As indicated in the second trace 112, pulsing the accelerator 64 to a high voltage accelerates the ions toward the reflectron 68 and, in effect, forms them into ion packets. At some later time the ions arrive at the reflectron 68 and are reflected. The reflected ions drift back through the flight tube 67 to the accelerator 64 where they are reflected back to toward the reflectron 68. The ions again travel through the flight tube 67 to the reflectron 68 where they are reflected back toward the accelerator 64. At some time after the ions of interest have been reflected by the accelerator 64 and before they arrive back at accelerator 64 a second time, the accelerator potential is pulsed to ground. The ions of interest then pass through the accelerator 64 and into the detector 63.

The second passage of the ions through the flight tube 67 effectively doubles the length of the analyzer 60 and thereby improves the mass resolving power of the instrument in this case from 10,000 in a single pass to 17,000. The third spectrum 103 and fourth spectrum 104 of FIG. 10 were obtained with three and four reflections of the ions by the reflectron 68, respectively (i.e., the ions made three and four complete passes through the analyzer 60, respectively). These spectra show improvements in resolution to 20,000 and 23,000 respectively.

In order to successfully analyze ions as outlined above, the proper accelerator and reflectron potentials and the proper timing of the accelerator 64 pulse must be used. Two methods for the determination of the appropriate potentials and timing according to the present invention are therefore outlined below.

Figure 12:
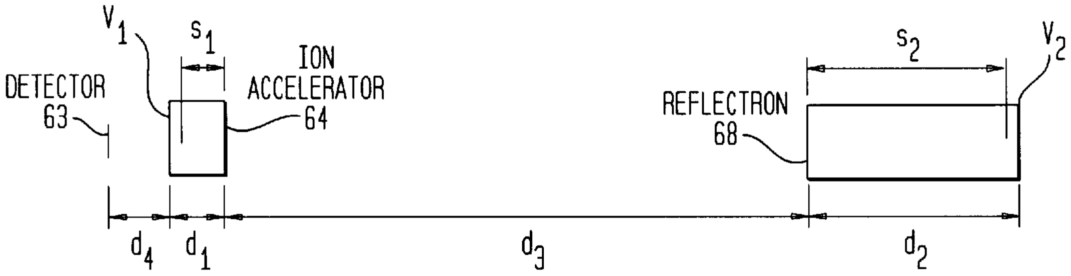
FIG. 12 depicts the geometry associated with a mass spectrometer in accordance with a preferred embodiment of the present invention.

FIG. 12 depicted is the geometry of a preferred embodiment of the analyzer 60 (see FIG. 6) according to the present invention. For the present discussion, it is assumed that the end of the ion accelerator 64 closest to the reflectron 68 and the end of the reflectron 68 closest to the accelerator 64 are held at ground potential. Potentials $V_1$ and $V_2$ are applied to the opposite ends of the accelerator 64 and reflectron 68, respectively. Potential $V_1$ is a pulsed potential as described with respect to FIG. 7 whereas potential $V_2$ is a constant DC potential. The accelerator 64 is a single stage accelerator as described with reference to FIG. 7. The reflectron 68 is preferably a single stage reflectron as described with reference to FIG. 2. The electrodes of the reflectron 68 are preferably stainless steel rings. As with the accelerator 64, these electrodes are distributed at regular intervals along the axis of the reflectron 68. The reflectron 68 is bound at either end by conducting mesh.

The potential $V_1$ should simply be as large as possible. The only limitations on $V_1$ would be the practical limitations due to arcing at too high a potential or digitization rates in the flight time recording device. If, for example, $V_1$ were too high then the resultant mass spectral peaks might be too narrow for the digitizer (oscilloscope) to properly record. In such a case, the resolution of the spectrometer would be limited by the digitizer. Improved resolution in such a case would be obtained at a lower voltage. In practice, the operator should select the highest practical potential for $V_1$.

To determine the potential for $V_2$. one must consider the geometry of the accelerator 64 and reflectron 68, the potential previously selected for $V_1$, and the starting position of the ions. The specific case discussed here is for a single stage reflectron and a single stage accelerator, however, to determine $V_2$ for any combination of single and/or multistage devices, one must set the distance traveled by the ion in the field free region of the spectrometer equal to the sum of the "focal lengths" of the accelerator and reflectron times the number of times the ion travels through them and then solve for $V_2$. Here "focal length" refers to the distance, outside of the reflecting device, between an initial object/image plane and that image plane formed by the accelerator or reflectron.

Figure 1:
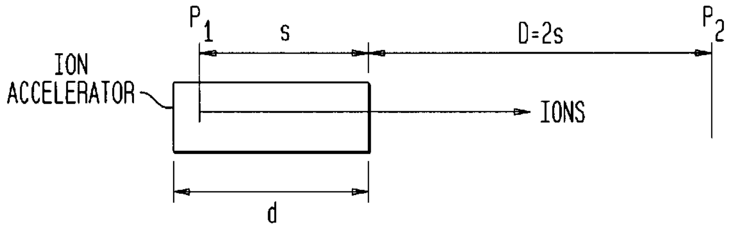
FIG. 1 (PRIOR ART)
FIG. 1 illustrates the geometry associated with a prior art accelerator.

From equation 4 and FIG. 12, the effective focal length, $F_r$, for a preferred embodiment for a reflectron is given by:

$$F_r=4nS_2 \qquad (6)$$

where n is the number of times the ions have passed through the reflectron. From the discussion with regard to FIG. 1, the focal length, $F_o$, for a preferred embodiment for an accelerator as it is initially accelerating ions from their starting positions is given by:

$$F_o=2s_1 \qquad (7)$$

Finally, the focal length, $F_a$, for the preferred embodiment for an accelerator as it reflects ions that are returning from the accelerator is given by:

$$F_a=4(n-1)s_1 \qquad (8)$$

The factor "n−1" in equation 8 arises from the fact that ions which have been reflected by the reflectron n times and then detected have only been reflected by the accelerator n−1 times. Clearly from FIG. 12, the distance, $D_{ff}$, traveled by the ions in the field free region of the analyzer is, in the preferred embodiment, given by:

$$D_{ff}=2nd_3+d_1+d_4 \qquad (9)$$

Setting the total distance traveled in the field free region of the analyzer equal to the total effective focal length gives the condition for optimizing the mass resolution of the analyzer:

$$D_{ff}=F_o+F_a+F_r \qquad (10)$$

and, $$2nd_3+d_1+d_4=2s_1+(n-1)4s_1+4ns_2 \qquad (11)$$

The sum of the potential and kinetic energy of the ions during the analysis is fixed at the time the high voltage pulse is applied to the accelerator. The total energy of the ion during the analysis is given by:

$$\in=qV_1s_1/d_1 \qquad (12)$$

where q is the charge on the ion. The total energy of the ion is also related to $s_2$ by:

$$\in=qV_2s_2/d_2 \qquad (13)$$

By these two equations, one finds:

$$S_2=s_1d_2V_1/d_1V_2 \qquad (14)$$

Substituting this into equation 11 and solving for $V_2$ one obtains:

$$V_2=4nV_1s_1(d_2/d_1)/(2nd_3+d_4+d_1-4s_1(n+½)) \qquad (15)$$

Figure 13:
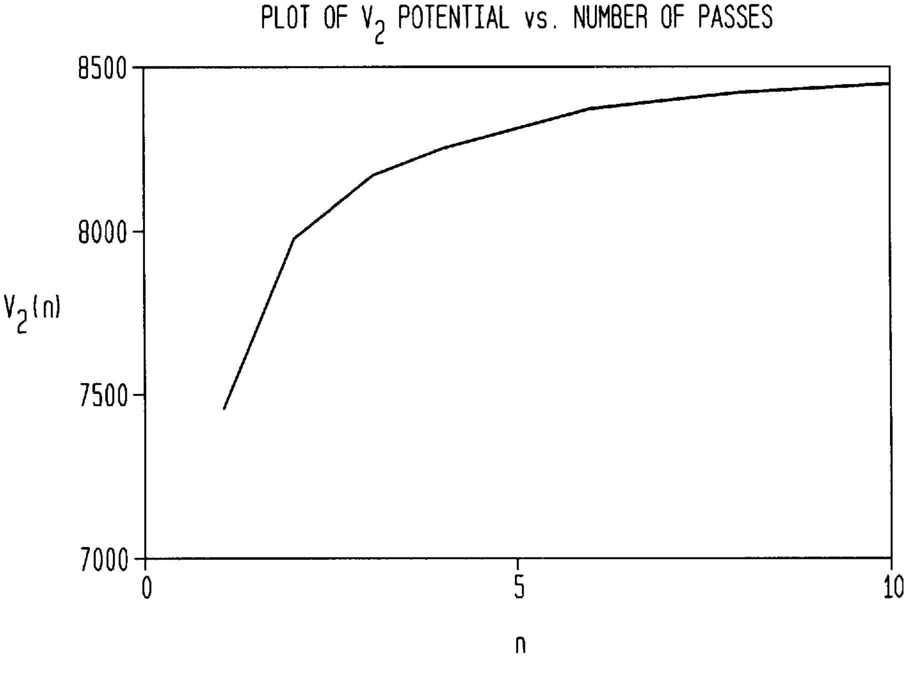
FIG. 13 shows a plot of the potential $V_2$ applied to the reflectron of a preferred embodiment of the present invention as a function of the number of reflections (n)

Assuming $d_1$=0.06 m, $d_2$=0.47 m, $d_3$=0.83 m, $d_4$=0.041 m, $s_1$=0.0575 m, and $V_1$=6,800 V, one obtains the plot of $V_2$ vs n shown in FIG. 13.

To summarize, the method described in detail above to determine the appropriate potential $V_2$ comprises the following steps:

1) selecting a potential for $V_1$ based on practical limitations;

2) determining a first equation describing the total distance traveled by the ions in the field free regions of the spectrometer as a function of n;

3) determining a second equation describing the total effective focal length of the accelerating and reflecting devices as a function of n;

4) deriving a third equation by setting the first equation equal to the second equation;

5) determining a fourth equation(or set of equations) relating the potential(s) applied to the reflectron to those applied to the other reflecting and accelerating devices in the spectrometer;

6) deriving a fifth equation (or set of equations) by substituting said forth equation(s) for the reflectron potential(s) in said third equation; and 7) solving said fifth equation (or set of equations) for the potential(s) applied to the reflectron as a function of n.

This method as generally defined in steps 1 through 7 is demonstrated above for a specific instance but can be applied to analyzers having any combination of single stage or multistage accelerating or reflecting devices. Wiley and Maclaren, for example, have derived an equation for determining the focal length of a two stage accelerator. Schlag et. al. have described a similar equation for determining the focal length of a two stage reflectron. Using such equations in conjunction with steps 1 through 7 would give a solution valid for an analyzer with a two stage accelerator and a two stage reflectron.

Alternatively, or in conjunction with steps 1 through 7 above, the optimum value for $V_2$ might be determined by calculating a value for $V_2$, setting the potential on the reflectron in successive experiments to several values near the calculated potential, and then evaluating the resolution of the spectra obtained to determine a new value for $V_2$. By repeating such measurements many times while readjusting $V_2$ always towards that value which provides the best resolution of any given series of measurements, the value of $V_2$ which provides the optimum resolution can be determined.

Having all the potentials and geometry set, it is a simple matter to determine the flight time of a given m/q ion through the analyzer. The flight time of an ion would be the sum of the time the ion spends in the accelerator, $t_a$, the reflectron, $t_r$, and the field free, $t_{ff}$, regions of the spectrometer. The flight time of the ion in the field free region of the preferred embodiment analyzer is given by:

$$t_{ff}=(2nd_3+d_1+d_4)(md_1/2s_1qV_1)^{1/2} \quad (16)$$

The flight time of the ion in the accelerator according to the preferred embodiment is given by:

$$t_a=(2n-1)(2s_1d_1m/qV_1)^{1/2} \quad (17)$$

Finally, the flight time of the ion in the reflectron according to the preferred is given by:

$$t_r=(2nd_2/V_2)(2s_1V_1m/qd_1)^{1/2} \quad (18)$$

Combining equations 16, 17, and 18 yields the total flight time (tof):

$$tof=2n(m/q)^{1/2}[d_3 (d_1/2s_1V_1)^{1/2}+ (2s_1d_1/V_1)^{1/2}+ (d_2/V_2)(2s_1V_1/d_1)^{1/2}]+ (m/q)^{1/2}[(d_1+d_4)(d_1/2s_1V_1)^{1/2}- (2s_1d_1/V_1)^{1/2}] \quad (19)$$

Figure 14:
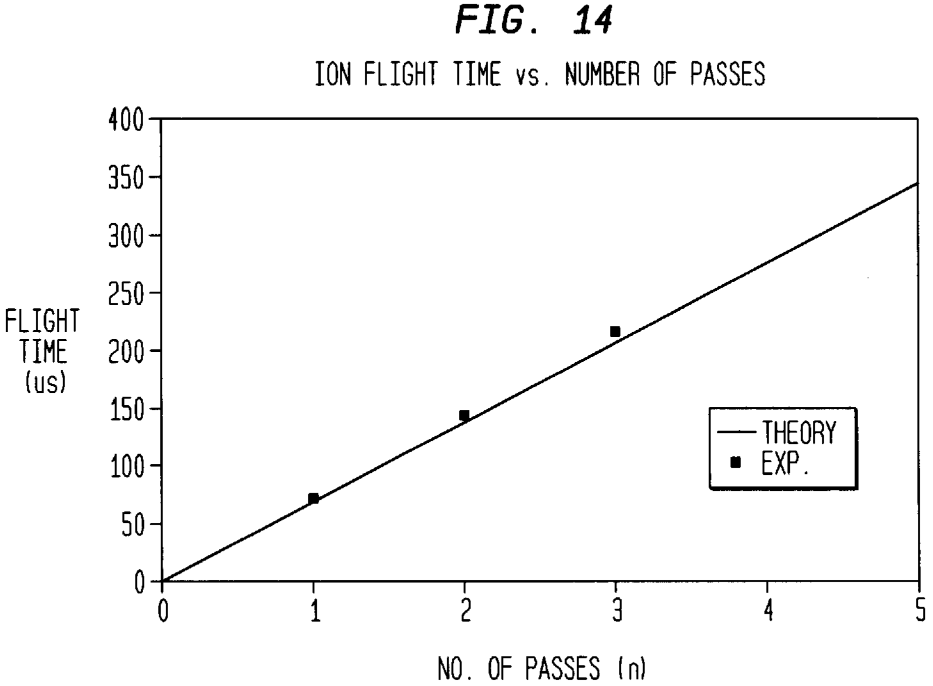
FIG. 14 shows a plot of the flight time of leu-enkephalin ions as a function of the number of passes made through a mass spectrometer instrument in accordance with a preferred embodiment of the present invention.

With the assumptions already given above and the assumption that the m/q of the ion is 556, the total flight time is plotted as a function of n in FIG. 14. Note also the flight time of leu-enkephalin as observed in the spectra of FIG. 10 are plotted in FIG. 14. The experimental and observed values agree to within the error of the measurement of the geometry, and potentials of the instrument.

Given a fixed geometry and fixed potentials, equation 19 can be reduced to:

$$tof=(m/q)^{1/2}(an+b) \quad (20)$$

where a and b are constants. Also, for a fixed value of n, equation 20 can be reduced to:

$$tof=(m/q)^{1/2} \quad (21)$$

where A is a constant. Thus, it is possible to calibrate the instrument based on experimental results rather than from measurements of the geometry of the analyzer and the potential applied to the accelerator. To "calibrate the instrument" in the sense given here means to establish a relationship between tot and m/q. Using equation 20 and measurements of the flight times of two different m/q ions through the instrument or the flight time of the same m/q ions with two different values of n, one can solve for a and b. This solution, however, assumes that the value of $V_2$ is varied with n according to equation 20. Thus, the error in the resultant calibration is dependent on the error in setting $V_2$ to the theoretical value.

In contrast, the instrument can be calibrated using equation 21 and the flight time measurement of at least one known m/q ion. In such a case there is no longer a dependence on the setting of $V_2$. In practice the measured flight time is typically offset by a constant value due to, for example, delays built into the pulsing circuits and digitizer. Thus, equation 21 would become:

$$tof_m=(m/q)^{1/2}A+B \quad (22)$$

where $tof_m$ is the measured flight time and B is a constant. So, to calibrate the instrument in practice, two measurements must be used with equation 22 to experimentally calibrate the instrument.

As discussed above and in reference to FIG. 12, the accelerator 64 is pulsed to a high voltage to initialize the TOF mass analysis. The analysis is concluded and the ions are allowed to pass through the accelerator 64 to the detector 63 by pulsing the accelerator 64 back to ground potential. To relate the ion m/q range of interest to the time that the accelerator 64 is brought back to ground potential, one must determine the m/q of the ions that would, if present, be returning from the reflectron 68 and entering the accelerator 64 at the time it is pulsed to ground. These would be the lowest m/q ions measurable in the given analysis. Similarly, the m/q of the ions that would, if present, be exiting the accelerator 64 in the direction of the reflectron 68 must be determined. These would be the highest m/q ions that could be measured in the given analysis.

To obtain the m/q of the lowest m/q ions measurable in a given analysis, one need only modify equation 19 so that it does not include $d_1$ and $d_4$ in the calculation of the flight time of the ion in the field free drift region. Equation 19 then becomes:

$$t_{off}=<tof=2n(m/q)^{1/2}[d_3 (d_1/2s_1V)^{1/2}+(2s_1d_1/V_1)^{1/2}+ (d_2/V_2)(2s_1V_1/d_1)^{1/2}]-(m/q)^{1/2} (2s_1d_1/V_1)^{1/2} \quad (23)$$

Solving this for m/q yields:

$$m/q>=t_{off}^2/[2nd_3(d_1/2s_1V_1)^{1/2}+(2nd_2V_2)(2s_1V_1/d_1)^{1/2}+ (2n-1)(2s_1d_1/V_1)^{1/2}]^2 \quad (24)$$

To determine the high m/q limit to the m/q range equation 19 is modified so that for a given value of n, the flight time of the ion to the reflectron 68 and back only n−1 times is calculated and summed with the time required for the ion to be initially accelerated by the accelerator 64. This gives:

$$t_{off}>=tof=2(n-1)(m/q)^{1/2}[d_3(d_1/2s_1V_1)^{1/2}+(2s_1d_1/V_1)^{1/2}+ (d_2/V_2)(2s_1V_1/d_1)^{1/2}]+(2s_1d_1/V_1)^{1/2} \quad (25)$$

Solving for m/q one obtains:

$$m/q<=t_{off}^2/\{2(n-1)[d_3(d_1/2s_1V_1)^{1/2}+(2s_1d_1/V_1)^{1/2}+ (d_2/V_2)(2s_1v_1/d_1)^{1/2}]+(2s_1d_1/V_1)^{1/2}\}^2 \quad (26)$$

Figure 15:
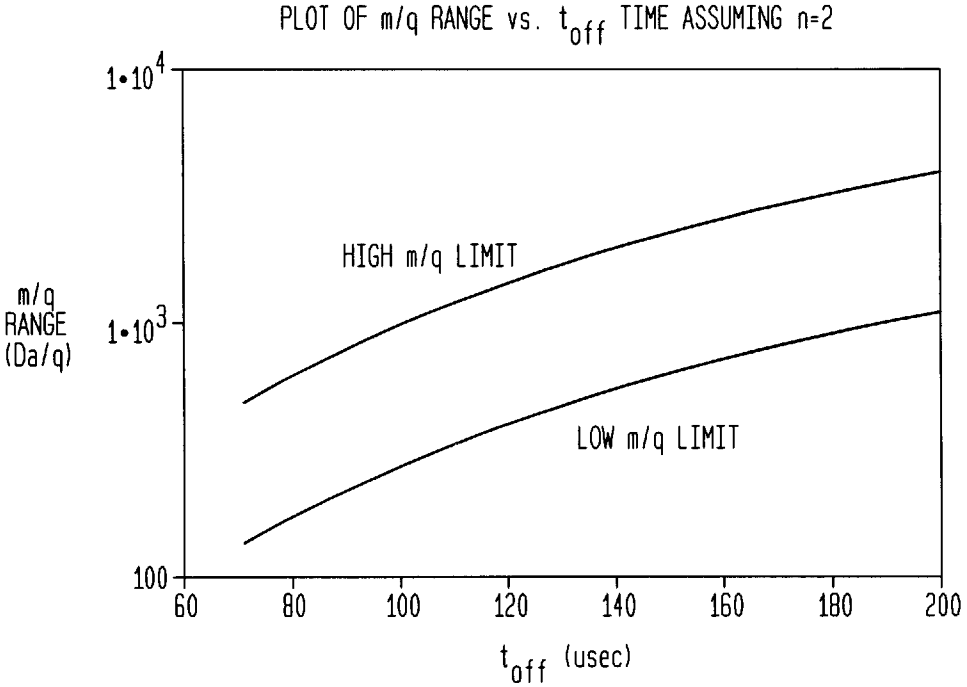
FIG. 15 shows the observed upper and lower mass limits of the mass-to-charge (m/q) of ions plotted as a function of the time the accelerator is pulsed to ground potential, assuming n=2.

For a given value of n, equations 24 and 26 give the bounds on the range of m/q ions which can be detected with a given $t_{off}$ time. As an example, FIG. 15 shows a plot of the m/q range as a function of $t_{off}$ for n=2 assuming the conditions discussed above. Given a desired m/q range, one can use equations 23 and 25 to determine the $t_{off}$ time that provides the best coverage of that m/q range for a given value of n. To summarize, the method described in detail above to 1) determine the appropriate $t_{off}$ for a desired m/q range and value of n comprises the following steps of:

1) determining a first equation, in accordance with the method described above, which relates the value of the potential(s) on the reflectron to n;

2) deriving a second equation based on the first equation and other fixed parameters in the instrument which can be used to determine the flight time of ions of the minimum desired m/q from their starting positions, n−1 times reflected through the accelerator, and n times reflected through the reflectron such that said ions are entering the accelerator for the $n^{th}$ time at the end of the determined flight time;

3) using said second equation to determine the maximum time at which the accelerator may be pulsed to ground potential given n and a minimum m/q;

4) deriving a third equation based on the first equation and other fixed parameters in the instrument which can be used to determine the flight time of ions of the maximum desired m/q from their starting positions, n−1 times reflected through the reflectron, and n−1 times reflected through the accelerator such that said ions would be exiting the accelerator toward the reflectron for the $n^{th}$ time at the end of the determined flight time; and 5) using said third equation to determine the maximum time at which the accelerator may be pulsed to ground potential given n and a maximum m/q.

This method as generally defined in steps 1 through 5 is demonstrated above for a specific instance but can be applied to analyzers having any combination of single stage or multistage accelerating or reflecting devices.

As when considering the instrument calibration above, it is possible also to relate the m/q range to $t_{off}$ experimentally. Assuming a given value for $V_1$, equations 23 and 25 can be reduced to:

$$(m/q)_{max}*(a_1n+b_1)^2<=t_{off}^2<=(m/q)_{min}*(a_2n+b_{22})^2 \quad (27)$$

where $a_1$, $b_1$, $a_2$, and $b_2$ are unknown constants, and $(m/q)_{max}$ and $(m/q)_{min}$ are the maximum and minimum m/q ions, respectively, in the analyzed range. A minimum of four experimental measurements must be made and used with equation 27 to solve for the unknown constants. The measured values would not be of ion flight times but rather what the upper and lower cutoffs in m/q are under given circumstances. Two upper cutoff measurements would be made to determine $a_1$ and $b_1$. Two lower cutoff measurements would be made to determine $a_2$ and $b_2$.

Thus, as a second method for determining $t_{off}$, assuming a given n and, a desired m/q range, one may, regardless of the number of stages in the accelerating or reflecting devices:

1) measure the minimum m/q that can be analyzed for a given n and $t_{off}$ for at least two different values of n or two different values of $t_{off}$;

2) measure the maximum m/q that can be analyzed for a given n and $t_{off}$ for at least two different values of n or two different values of $t_{off}$; and 3) using the four experimental values obtained in steps one and two, solve equation 27 simultaneously for the constants $a_1$,$a_2$,$b_1$, an $b_2$.

The maximum theoretical resolution of the instrument according to the present invention is mainly dependent on focusing ability of the reflecting devices. The resolution of an instrument as measured at a given mass spectral peak is defined to be the m/q of the peak divided by the width of the peak at half its maximum intensity. The resolution of TOF instruments is always less than infinity because of aberrations in the flight times of the ions. If one considers an analysis in which the ions make only one passage through the analyzer (i.e. n=1), then flight time errors associated with the initial acceleration of the ions, the initial deflection of the ions by the multideflector, the detection of the ions, the digitization of ion signals, and the inability of the reflectron to perfectly temporally focus over the distribution of ion energies present all contribute significantly to the distribution of flight times observed in resultant mass spectra. The distribution in ion flight times for a given m/q ion, err, may be expressed as:

$$err=(x^2+(ny)^2)^{1/2} \quad (28)$$

where y is the error associated with the reflectron and x is the flight time error associated with the rest of the instrument. The resolution of the instrument is then given by:

$$R=tof/2err \quad (29)$$

Figure 16:
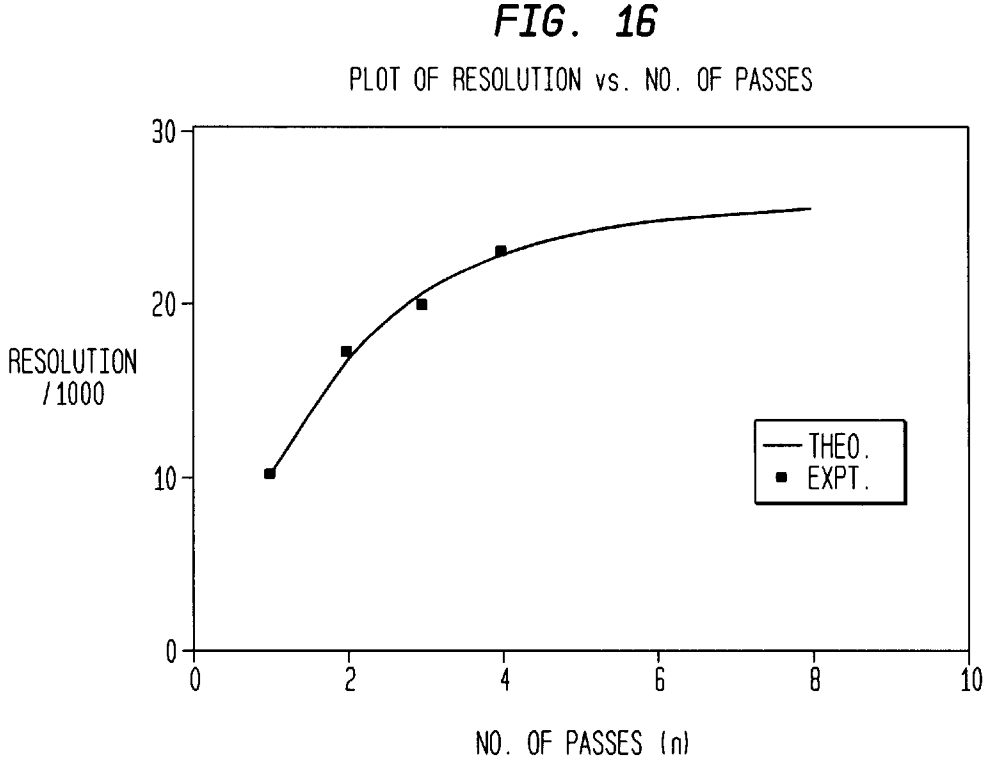
FIG. 16 shows a plot of the optimum resolution that can be obtained as a function of n using a mass spectrometer in accordance with a preferred embodiment of the present invention.

Considering the results of FIG. 10 for leu-enkephalin, if one assumes that the imperfect focusing of the reflectron results in, y, a 1.3 ns distribution in ion flight times, and all other instrument errors combined result in, x, a 3.3 ns distribution in ion flight times, then equation 29 can be plotted as a function of n as shown in FIG. 16. After many passes, the resolution of the instrument would be given by:

$$R=tof/2err\sim(m/q)^{1/2}an/2ny=(m/q)^{1/2}a/2y \quad (30)$$

Thus, the resolution of the instrument has an upper limit which is primarily dependent on the focusing ability of the reflectron. For the leu-enkephalin data of FIG. 10, this upper limit would be about R~74,000 ns/2*1.3 ns=28,400. It is well known that multistage reflectrons can be used to focus ions over a broader distribution of energies or focus ions of a given energy distribution to a greater extent than when using single stage reflectrons. Thus, by using a multistage reflectron one may reduce y and thereby increase the limit on the instrument's resolution.

In the above discussions relating to the preferred embodiment of the invention, it was assumed that the reflectron 68 was held at a fixed potential whereas the accelerator 64 was pulsed to high voltage and back to ground. However, it should be clear that the same structure of electrodes 78, mesh 72,76, and RC network 74 described for the accelerator 64 can be used in substantially the same manner to produce and operate the reflectron 68 in a pulsed manner. Thus, one could in alternate embodiments of the mass spectrometer pulse either or both the reflectron 68 and accelerator 64.

Figure 17:
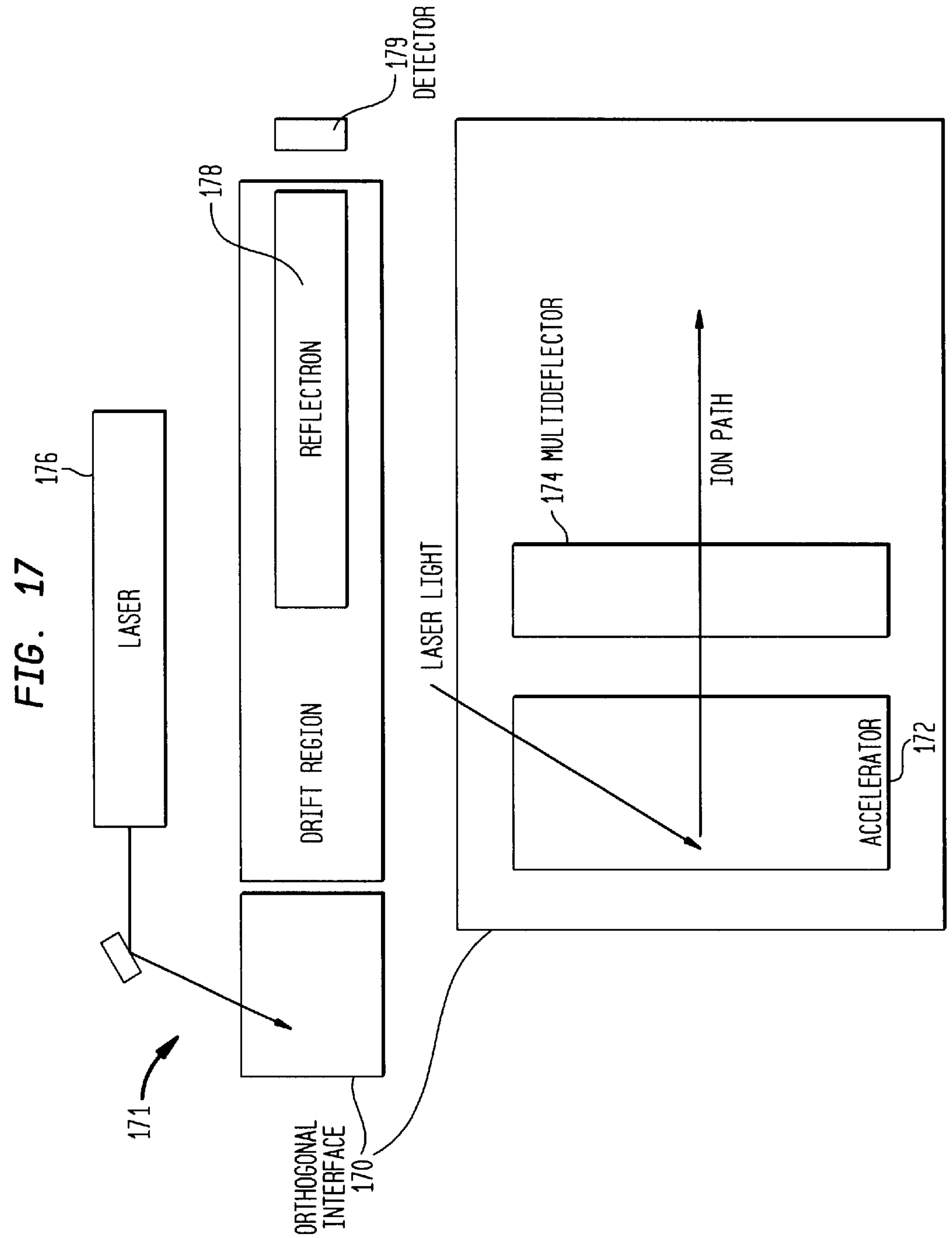
FIG. 17 shows an alternate embodiment of a time-of-flight mass spectrometer according to the present invention wherein the accelerator is not pulsed but the reflectron is pulsed on and off to allow for the analysis and detection of ions, respectively.

Therefore, FIG. 17, for example, shows an alternate embodiment of the TOF mass spectrometer (analyzer 171) according to the present invention wherein the accelerator 172 may or may not be pulsed but the reflectron 178 is pulsed "ON" and "OFF" to allow for the analysis and detection of ions respectively. A pulse of ions is produced within the accelerator 172 by, for example, laser 176 (laser ionization). The accelerator potential may be pulsed some time after the ions are formed or the ions may be immediately accelerated by the accelerator 172 along the axis of the analyzer 171 toward the reflectron 178. At the beginning of the analysis, the reflectron 178 is energized. Thus, ions reaching the reflectron 178 are reflected back in the direction of the accelerator 172. The ions are then reflected back and forth between the accelerator 172 and reflectron 178 an indefinite number of times until the analysis is concluded by pulsing the reflectron 178 "OFF". At such a time the ions are then able to pass freely through the reflectron 178 and into the detector 179 adjacent to it. Note that the methods described above for determining the potentials applied to the accelerator 172 and reflectron 178 and for determining the time at which to pulse the potential on the reflectron 178 still apply except that the analytical method for determining $t_{off}$ must be modified to read:

1) determining a first equation, in accordance with the method described above, which relates the value of the potential(s) on the reflectron to n;
2) deriving a second equation based on the first equation and other fixed parameters in the instrument which can be used to determine the flight time of ions of the go minimum desired m/q from their starting positions, n times reflected through the reflectron, and n times reflected through the accelerator such that said ions would be arriving at the reflectron for the $(n+1)^{th}$ time at the end of the determined flight time;
3) using said second equation to determine the maximum time at which the accelerator may be pulsed to ground potential given n and a minimum m/q;
4) deriving a third equation based on the first equation and other fixed parameters in the instrument which can be used to determine the flight time of ions of the maximum desired m/q from their starting positions, n times reflected through the reflectron, and n−1 times reflected through the accelerator such that said ions would be exiting the reflectron for the $n^{th}$ time at the end of the determined flight time; and
5) using said third equation to determine the maximum time at which the reflectron may be pulsed to ground potential given n and a maximum m/q.

The above mentioned laser ionization may take the form of, for example, matrix assisted laser desorption ionization (MALDI). In such a case, the accelerator electrode farthest from the reflectron would be a solid metal plate or a conducting sample probe rather than a gridded ring as discussed with regard to FIG. 7. This sample plate would have deposited on it solid sample material. The sample material under MALDI conditions would consist of sample material dissolved in a solid organic matrix. In such a case, the accelerator might be pulsed at some time after the laser excites the sample material. The delay between the laser pulse and accelerator pulse and the potential applied to the accelerator may be adjusted to perform space velocity correlation focusing and thereby improve the resolution of the instrument. Such focusing is well known in the literature (see for example, Reilly et al. U.S. Pat. No. 5,504,326).

Figure 18:
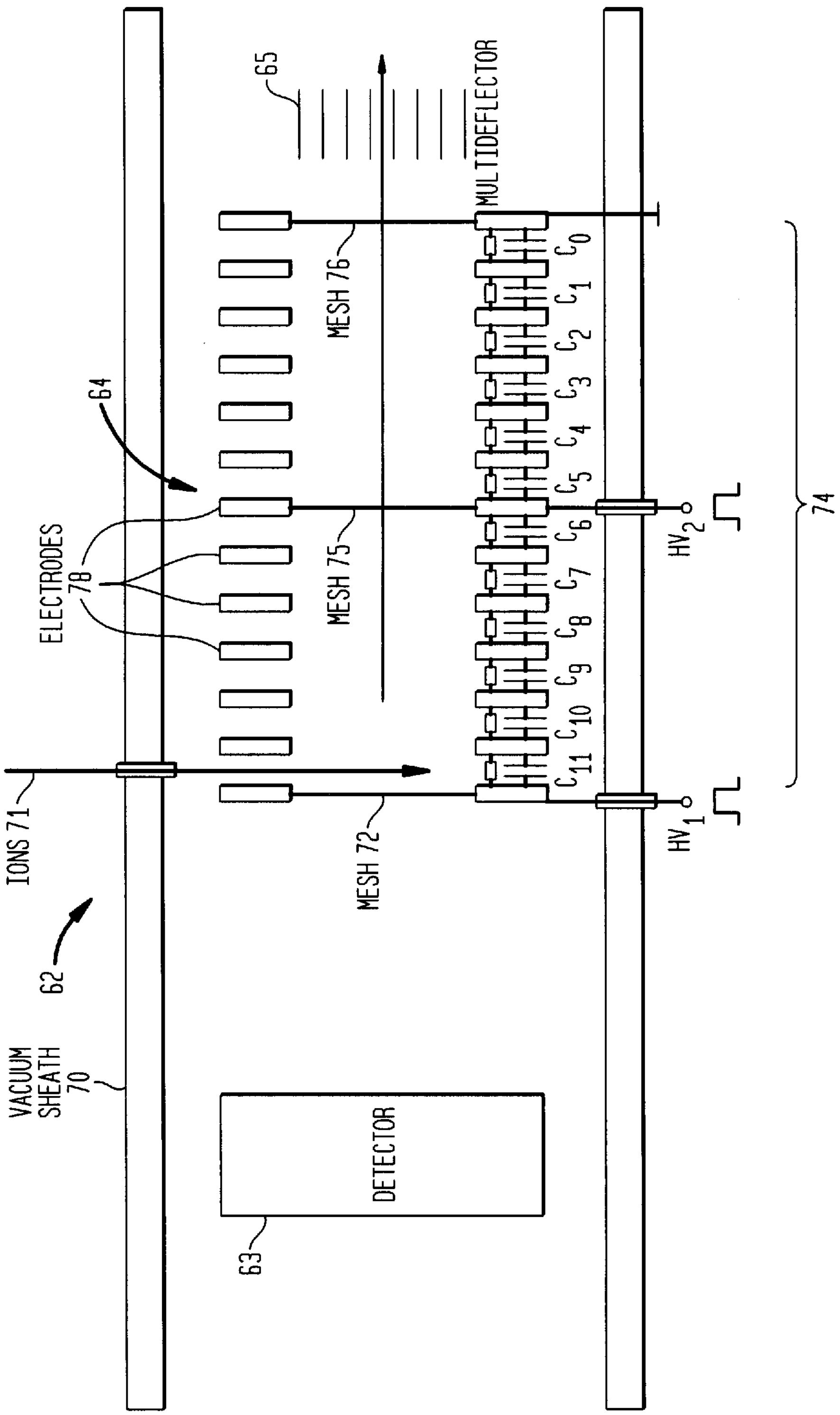
FIG. 18 shows a diagram of an alternate embodiment of an orthogonal interface according to the present invention wherein the accelerator is used as a two stage accelerator.

In the above discussions relating to the preferred embodiment of the invention, it was assumed that the reflectron and accelerator were single stage devices. However, as depicted in FIG. 18 it is possible to use these as multistage devices. As depicted in FIG. 18, one could, by adding a mesh 75 to one of the central electrodes and applying a high voltage pulse, $HV_2$, to that electrode, use the accelerator 64 as a two stage device rather than the single stage device depicted in FIG. 7. Any number of stages of acceleration may be produced and used in this way. By a similar means, a multiple stage reflectron could be produced and operated. Also, it should be clear that if a multistage device is used, not all stages of the device need be pulsed "ON" or "OFF" and not all stages that are pulsed need be pulsed simultaneously.

It should be understood that whereas those embodiments depicted in FIGS. 7 and 18 use fine conducting mesh to bound the accelerator 64, one or both of the terminal electrodes might instead be planar apertured electrodes having no such mesh. Also, the "aperture" in such a terminal electrode might take the form of a circular hole in the otherwise solid electrode or the aperture might take the form of a slit in the plate.

Also, it should be noted that waveforms other than simple square waves might be applied to input of the RC network 74 of the accelerating or reflecting device. In the use of space velocity correlation focusing this may be valuable in improving the resolution of the instrument over that using a simple square wave or in improving the m/q range over which a calibration function holds.

Figure 19:
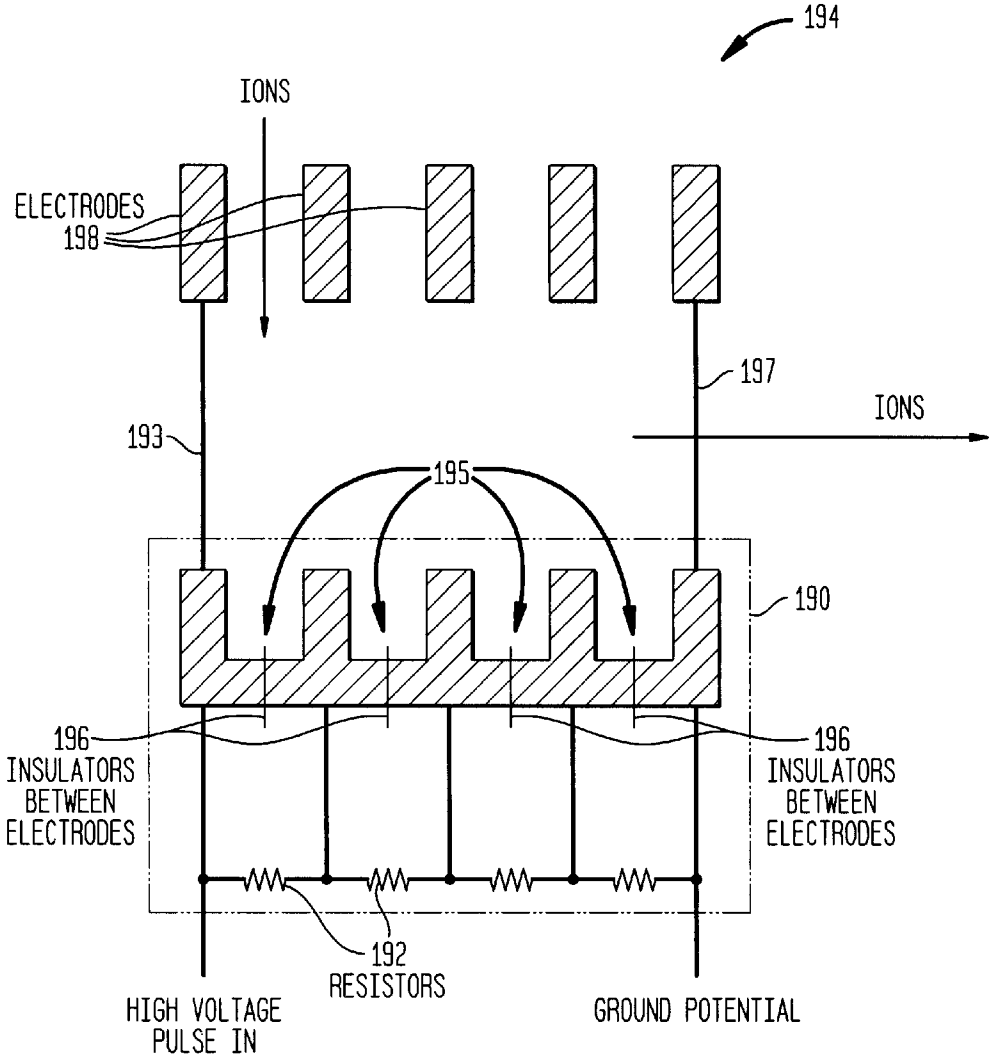
FIG. 19 shows a diagram of an alternate embodiment of the accelerator according to the present invention wherein the capacitors of the RC network are formed from the electrodes of the accelerator.

Turning next to FIG. 19, shown is a diagram of one possible alternate embodiment of an accelerator 194 according to the present invention. As shown, the capacitors 195 of the RC network 190 are formed from the electrodes 198 of the accelerator 194. In this case, the conductive material of the electrodes 198 is extended toward adjacent electrodes and a thin film of dielectric material 196 is used to electrically insulate the electrodes from one another. The capacitance between two electrodes is then determined by $C=\epsilon_o \kappa A/d$, where $\epsilon_o$ is the permittivity of free space, κ is the dielectric constant of the dielectric, A is the area of the electrode used to form the capacitor, and d is the distance between the surfaces of those portions of the electrodes used to form the capacitor. The capacitors 195 of the RC network 190 might be similarly used to form an alternate embodiment of a reflectron.

Figure 20:
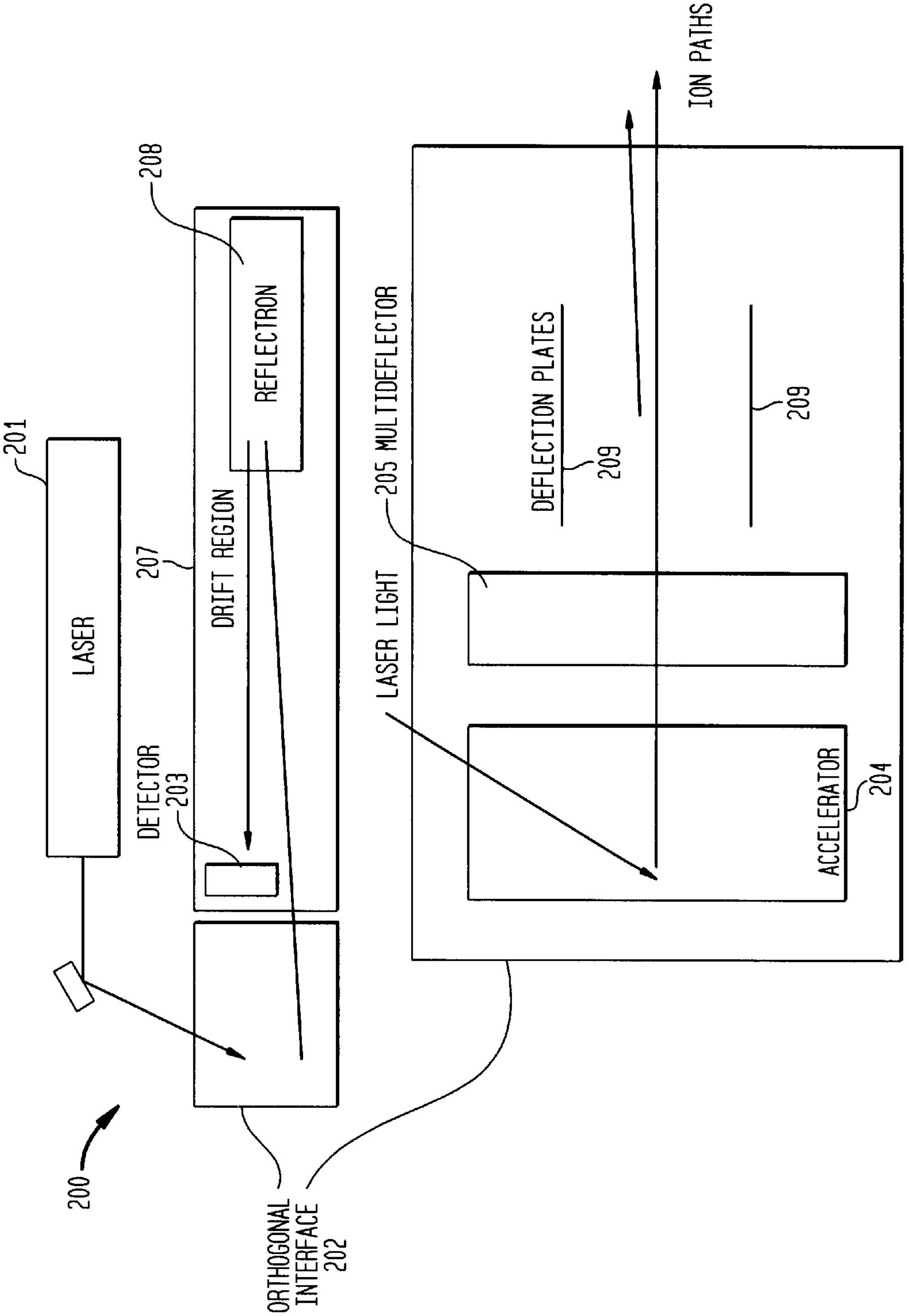
FIG. 20 shows an alternate embodiment of a mass spectrometer according to the present invention wherein neither the accelerator nor the reflectron are pulsed and ions are deflected at the end of an analysis by a deflecting device onto a io trajectory leading to a detector.

Now, with reference to FIG. 20, shown is another alternate embodiment of the mass spectroscopic analyzer 200 according to the present invention, wherein the accelerator 204 or the reflectron 208 are not necessarily pulsed. In this case, ions might be generated external to the accelerator 204, if the accelerator 204 is pulsed "ON", or in the accelerator

204, in which case the accelerator 204 may be continuously energized. In either case, the reflectron 208 is statically "ON" so that ions may be reflected back and forth between the accelerator 204 and the reflectron 208 multiple times. To conclude the analysis ions are deflected at the end of an analysis by a deflecting device 205,209 onto a trajectory which ends at a detector 203. The deflecting device 205,209 may, for example be a multideflector 205 or a pair of conventional deflection plates 209.

Figure 21:
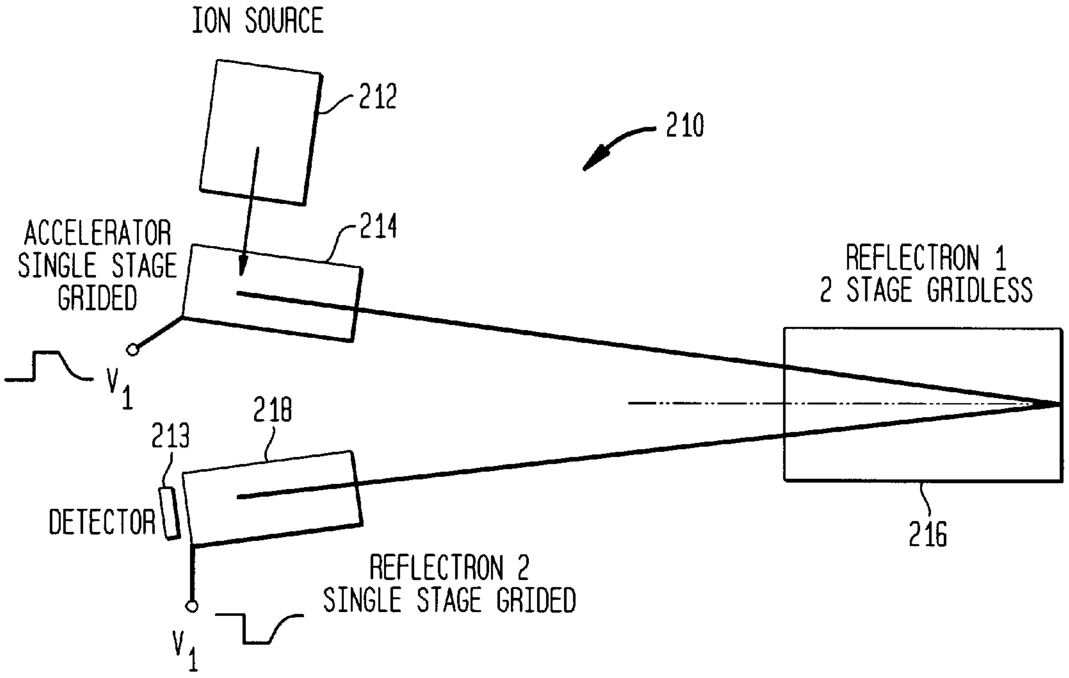
FIG. 21 shows an alternate embodiment of a mass spectrometer according to the present invention wherein three reflecting devices are used and ions are reflected back and forth between them along a "v" shaped path.

In yet another embodiment of a mass spectroscopic analyzer 210 according to the present invention, three reflecting devices 214,216,218 are used. As depicted in FIG. 21, an ion accelerator 214 is used to accelerate the ions, and two reflectrons 216,218 are used to reflect ions multiple times through a v-shaped trajectory. The accelerator 214 is of substantially the same design as discussed with respect to the preferred embodiment and is operated in the same manner as the embodiments discussed above. The first reflectron 216 is designed and operated in substantially the same manner as discussed with respect to the other embodiments above. However, in the alternate embodiment depicted in FIG. 21, the first reflectron 216 is a two stage reflectron as described by Frey et al. in U.S. Pat. No. 4,731,532. The dimensions of the first reflectron 216 are sufficient that ions entering at a small angle with respect to the axis of the first reflectron 216 can pass through the first reflectron 216 and pass out of the first reflectron 216 at a small angle with respect to the axis of the first reflectron 216 but on the opposite side of the axis as it entered. Reflectrons with such dimensions are known for single and multiple stage reflectrons from prior art. See, for example, Frey et al. U.S. Pat. No. 4,731,532. Frey et al. teach the use of a two stage gridless reflectron wherein ions enter and exit the reflectron at an angle of 4° with respect to the axis of the reflectron. The second reflectron 218 is substantially similar in design, dimension, and operation to that of the accelerator 214. The second reflectron 218 accepts ions from the first reflectron 216 and, during the analysis, reflects the ions back toward the first reflectron 216.

In the alternate embodiment depicted in FIG. 21, an analysis is initiated by pulsing the accelerator 214 to a high voltage. However, because the ions are not detected by a detector behind the accelerator 214, the accelerator 214 need not be pulsed rapidly to ground. Rather the accelerator 214 must be at ground potential only by the time the next analysis is to occur. Ions travel first from the accelerator 214 to the first reflectron 216. Ions are reflected by the first reflectron 216 into the second reflectron 218. While the second reflectron 218 is at its analysis potential, ions will be reflected back toward the first reflectron 216. Ions returning to the first reflectron 216 will be reflected back toward the accelerator 214. In this manner, ions will continue to be reflected back and forth between the three reflecting devices 214,216,218 so long as the potential on the second reflectron 218 is held at its analysis voltage. To conclude the analysis, the potential on the second reflectron 218 is pulsed to ground so that ions may pass through it and into a detector 213 behind it.

Note that although the second reflectron 218 must be pulsed to ground rapidly to conclude an analysis, it need not be brought rapidly back to the high voltage at which the analysis occurs. Rather it must be at its analysis potential only by the time the next analysis is to occur. For convenience sake, the potential on the second reflectron 218 is taken to be the same as that applied to the accelerator 214, however, it is possible to adjust the accelerator 214 and second reflectron 218 potentials independently.

The methods described above for determining the potential applied to the first reflectron and for determining the time at which to pulse the potential on the second reflectron still applies to this embodiment except that the analytical method for determining $t_{off}$ must be modified to read:

1) determining a first equation, in accordance with the method described above, which relates the value of the potential(s) on the first reflectron to n;
2) deriving a second equation based on the first equation and other fixed parameters in the instrument which can be used to determine the flight time of ions of the minimum desired m/q from their starting positions, n times reflected through the second reflectron, 2n+1 times reflected through the first reflectron, and n times reflected through the accelerator such that said ions would be arriving at the second reflectron for the $n^{th}$ time at the end of the determined flight time;
3) using said second equation to determine the maximum time at which the accelerator may be pulsed to ground potential given n and a minimum m/q;
4) deriving a third equation based on the first equation and other fixed parameters in the instrument which can be used to determine the flight time of ions of the maximum desired m/q from their starting positions, n times reflected through the second reflectron, 2n−1 times reflected through the first reflectron, and n−1 times reflected through the accelerator such that said ions would be exiting the second reflectron for the $n^{th}$ time at the end of the determined flight time; and
5) using said third equation to determine the maximum time at which the reflectron may be pulsed to ground potential given n and a maximum m/q.

In the case of n=0, the m/q range of the instrument would be unlimited and the second reflectron would be held always at ground potential. Therefore if n=0 the term $t_{off}$ does not apply.

Also, although the analytical method described above for determining the optimum potential to apply to the reflectron is valid for the first reflectron 216, the potentials applied to a two stage reflectron as depicted in FIG. 21 might more readily be obtained by:

1) selecting a potential for $V_1$ based on practical limitations;
2) determining a first equation describing the total distance traveled by the ions in the field free regions of the spectrometer as a function of n;
3) determining a second equation describing the total effective focal length of the accelerating and reflecting devices as a function of n;
4) deriving a third equation by setting the first equation equal to the second equation;
5) solving said third equation to obtain a fourth equation relating the effective focal length per pass of reflectron 1 to n;
6) determining a fifth equation—such as equation 3a of Schlag et al. referred to above—relating the focal length of reflectron 1 and the geometry of reflectron 1 to the optimum penetration depth, $X_{A1}$, of the ion into the reflectron 1;
7) substituting said fourth equation into said fifth to equation to obtain a sixth equation relating $X_{A1}$ to n;
8) determining a seventh equation—such as equation 3b of Schlag et al. referred to above—relating ion energy, the length of the first stage of reflectron 1, and the focal length of reflectron 1 to the potential applied across the first stage of reflectron 1;

9) substituting said fourth equation into said seventh equation to obtain an eighth equation relating the potential applied across the first stage of reflectron 1 to n;

10) determining a ninth equation relating the ion kinetic energy, the potential applied across the first stage of reflectron 1, the length of the second stage of reflectron 1 to the potential applied to the back end of reflectron 1; and 11) substituting said eighth equation into equation 10 to obtain an equation relating the potential applied to the back of reflectron 1 to n.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the adjustable bungee cord fastening device of the present invention is capable of being embodied in other forms without departing from its essential characteristics.

What is claimed is:

1. A method of analyzing a sample using a time-of-flight mass spectrometer, said method comprising the steps of:

producing ions from a sample material;

introducing said ions into an ion accelerator;

accelerating said ions toward a first reflectron;

reflecting said ions toward a second reflectron at least one time using said first reflectron;

reflecting said ions from said second reflectron toward said first reflectron at least one time using said second reflectron;

reflecting said ions from said first reflectron toward said accelerator at least one time using said first reflectron;

reflecting said ions from said accelerator toward said first reflectron at least one time using said accelerator; and detecting said ions.

2. A method according to claim 1, wherein said ion accelerator is energized to accelerate said ions to a high kinetic energy.

3. A method according to claim 1, wherein said second reflectron is deenergized at a predetermined time such that said ions are reflected a predetermined number of times before passing through said second reflectron and into a detector.

4. A method according to claim 1, wherein the optimum potential applied to each of said reflectrons is determined by:

selecting the potential applied to the accelerator based on practical limitations;

determining a first equation describing the total distance traveled by the ions in the field free regions of the spectrometer as a function of the number of times the ions have been reflected by the reflectron;

determining a second equation describing the total effective focal length of the accelerating and reflecting devices as a function of the number of times the ions have been reflected by the reflectron;

deriving a third equation by setting the first equation equal to the second equation;

determining a fourth equation (or set of equations) relating the potential(s) applied to the reflectron to those applied to the other reflecting and accelerating devices in the spectrometer;

deriving a fifth equation (or set of equations) by substituting said forth equation(s) for the reflectron potential (s) in said third equation; and solving said fifth equation (or set of equations) for the potential(s) applied to the reflectron as a function of the number of times the ions have been reflected by the reflectron.

5. A method according to claim 1, wherein the time, $t_{off}$, at which either said accelerator or said reflectrons in front of said detector is deenergized is determined by:

measuring the minimum m/q that can be analyzed for a given n and $t_{off}$ for at least two different values of n or two different values of $t_{off}$;

measuring the maximum m/q that can be analyzed for a given n and $t_{off}$ for at least two different values of n or two different values of $t_{off}$; and using the four experimental values obtained in steps one and two, to solve the equation:

$$(m/q)_{max}*(a_1n+b_1)^2<=t_{off}^2<=(m/q)_{min}*(a_2n+b_2)^2$$

simultaneously for the constants $a_1$, $a_2$, $b_1$, an $b_2$.

6. A method according to claim 1, wherein said accelerator is energized to accelerate said ions to a high kinetic energy.

7. A method according to claim 6, wherein said accelerator is deenergized at a predetermined time such that said ions are reflected a predetermined number of times before passing through said accelerator and into a detector.

8. A method according to claim 6, wherein said reflectron is deenergized at a predetermined time such that said ions are reflected a predetermined number of times before passing through said reflectron and into a detector.

9. A method according to claim 1, wherein the time at which the accelerator is to be deenergized is determined by:

determining a first equation which relates the value of the potential(s) on the reflectron to n, the number of times the ions have been reflected by the reflectron;

deriving a second equation based on the first equation and other fixed parameters in the instrument which can be used to determine the flight time of ions of the minimum desired m/q from their starting positions, n−1 times reflected through the accelerator, and n times reflected through the reflectron such that said ions are entering the accelerator for the $n^{th}$ time at the end of the determined flight time;

using said second equation to determine the maximum time at which the accelerator may be pulsed to ground potential given n and a minimum m/q;

deriving a third equation based on the first equation and other fixed parameters in the instrument which can be used to determine the flight time of ions of the maximum desired m/q from their starting positions, n−1 times reflected through the reflectron, and n−1 times reflected through the accelerator such that said ions would be exiting the accelerator toward the reflectron for the $n^{th}$ time at the end of the determined flight time; and using said third equation to determine the maximum time at which the accelerator may be pulsed to ground potential given n and a maximum m/q.

10. A method according to claim 1, wherein the time at which the reflectron is to be deenergized is determined by:

determining a first equation which relates the value of the potential(s) on the reflectron to n;

deriving a second equation based on the first equation and other fixed parameters in the instrument which can be used to determine the flight time of ions of the minimum desired m/q from their starting positions, n times reflected through the reflectron, and n times reflected through the accelerator such that said ions would be arriving at the reflectron for the $(n+1)^{th}$ time at the end of the determined flight time;

using said second equation to determine the maximum time at which the reflectron may be pulsed to ground potential given n and a minimum m/q;

deriving a third equation based on the first equation and other fixed parameters in the instrument which can be used to determine the flight time of ions of the maximum desired m/q from their starting positions, n times reflected through the reflectron, and n−1 times reflected through the accelerator such that said ions would be exiting the reflectron for the $n^{th}$ time at the end of the determined flight time; and using said third equation to determine the minimum time at which the reflectron may be pulsed to ground potential given n and a maximum m/q.

11. A method according to claim 1, wherein the time at which the second reflectron is deenergized is found by:

determining a first equation which relates the value of the potential(s) on the first reflectron to n, the number of times the ions are reflected through the second reflectron;

deriving a second equation based on the first equation and other fixed parameters in the instrument which can be used to determine the flight time of ions of the minimum desired m/q from their starting positions, n times reflected through the second reflectron, 2n+1 times reflected through the first reflectron, and n times reflected through the accelerator such that said ions would be arriving at the second reflectron for the $n^{th}$ time at the end of the determined flight time;

using said second equation to determine the maximum time at which the second reflectron may be pulsed to ground potential given n and a minimum m/q;

deriving a third equation based on the first equation and other fixed parameters in the instrument which can be used to determine the flight time of ions of the maximum desired m/q from their starting positions, n times reflected through the second reflectron, 2n−1 times reflected through the first reflectron, and n−1 times reflected through the accelerator such that said ions would be exiting the second reflectron for the $n^{th}$ time at the end of the determined flight time; and using said third equation to determine the maximum time at which the second reflectron may be pulsed to ground potential given n and a maximum m/q.

12. A method according to claim 1, wherein said detecting occurs behind said ion accelerator.

13. A method according to claim 12, wherein said detecting occurs when said accelerator is deenergized.

14. A method according to claim 1, wherein said detecting occurs behind said first reflectron.

15. A method according to claim 14, wherein said detecting occurs when said first reflectron is deenergized.

16. A method according to claim 1, wherein said detecting occurs behind said second reflectron.

17. A method according to claim 16, wherein said detecting occurs when said second reflectron is deenergized.

18. A method according to claim 1, wherein an electrospray ionization source performs said producing ions.

19. A method according to claim 1, wherein an atmospheric pressure chemical ionization source performs said producing ions.

20. A method according to claim 1, wherein a matrix assisted laser desorption ionization source performs said producing ions.

21. A method according to claim 1, wherein said first reflectron comprises at least three conducting electrodes arranged parallel to one another along the axis of said first reflectron which are electrically connected to one another via a resistor-capacitor network, wherein the potentials on the electrodes are controlled by the potentials applied to the inputs of said resistor-capacitor network.

22. A method according to claim 21, wherein the capacitors of said resistor-capacitor network are formed by said electrodes.

23. A method according to claim 21, wherein terminal electrodes of said first reflectron comprise planar conducting mesh.

24. A method according to claim 21, wherein terminal electrodes of said first reflectron comprise planar, conducting, apertured plates.

25. A method according to claim 21, wherein terminal electrodes of said first reflectron comprise planar, conducting, plates having slits.

26. A method according to claim 1, wherein said second reflectron comprises at least three conducting electrodes arranged parallel to one another along the axis of said second reflectron which are electrically connected to one another via a resistor-capacitor network, wherein the potentials on the electrodes are controlled by the potentials applied to the inputs of said resistor-capacitor network.

27. A method according to claim 26, wherein the capacitors of said resistor-capacitor network are formed by said electrodes.

28. A method according to claim 26, wherein terminal electrodes of said second reflectron comprise planar conducting mesh.

29. A method according to claim 26, wherein terminal electrodes of said second reflectron comprise planar, conducting, apertured plates.

30. A method according to claim 26, wherein terminal electrodes of said second reflectron comprise planar, conducting, plates having slits.

31. A method according to claim 1, wherein said accelerator comprises at least three conducting electrodes arranged parallel to one another along the axis of said accelerator which are electrically connected to one another via a resistor-capacitor network, wherein the capacitors are arranged in parallel to the resistors of said network such that DC and AC potentials applied to the inputs of said network are divided in substantially the same manner, and wherein the potentials on said electrodes are controlled by the potentials applied to the inputs of said network.

32. A method according to claim 31, wherein the spatial extent of said accelerator in the direction of ion acceleration is large in comparison to both the initial spatial extent of the analyte ions in the direction of ion acceleration and the spatial extent of the ion accelerator normal to the direction of ion acceleration.

33. A method according to claim 32, where the capacitors of said network are formed by said electrodes.

34. A method according to claim 32, wherein terminal electrodes of said accelerator comprise planar conducting mesh.

35. A method according to claim 32, wherein terminal electrodes of said accelerator comprise planar, conducting, apertured plates.

36. A method according to claim 32, wherein terminal electrodes of said accelerator comprise planar, conducting, plates having slits.

* * * * *